United States Patent
Arai et al.

(10) Patent No.: US 10,668,758 B2
(45) Date of Patent: Jun. 2, 2020

(54) ELECTRONIC DEVICE USING TEST PATTERN, METHOD OF ANALYZING TEST PATTERN, AND NON-TRANSITORY RECORDING MEDIUM STORING INSTRUCTIONS TO ANALYZE TEST PATTERN

(71) Applicant: BROTHER KOGYO KABUSHIKI KAISHA, Nagoya, Aichi (JP)

(72) Inventors: Yusuke Arai, Aichi (JP); Kenta Horade, Tokai (JP); Tsuyoshi Ito, Aichi (JP); Kohei Terada, Kiyosu (JP); Tetsuya Saso, Aichi (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 141 days.

(21) Appl. No.: 15/874,999

(22) Filed: Jan. 19, 2018

(65) Prior Publication Data
US 2018/0207968 A1  Jul. 26, 2018

(30) Foreign Application Priority Data
Jan. 20, 2017  (JP) .................................. 2017-008915

(51) Int. Cl.
*B41J 29/393* (2006.01)
*B41J 11/00* (2006.01)
(Continued)

(52) U.S. Cl.
CPC .............. *B41J 29/393* (2013.01); *B41J 2/04* (2013.01); *B41J 2/2135* (2013.01); *B41J 11/008* (2013.01);
(Continued)

(58) Field of Classification Search
CPC ..... B41J 2/04; B41J 11/008; B41J 11/46; B41J 13/0027; B41J 2/04586; B41J 2/2135;
(Continued)

(56) References Cited

U.S. PATENT DOCUMENTS 9,073,309 B1 * 7/2015 Murayama ........... B41J 2/04505
2013/0286079 A1   10/2013 Uchida
2015/0298153 A1 * 10/2015 Baker ..................... B05B 12/12
                                                     438/7

FOREIGN PATENT DOCUMENTS

JP           2013-226759 A    11/2013

* cited by examiner

*Primary Examiner* — Thinh H Nguyen
(74) *Attorney, Agent, or Firm* — Scully Scott Murphy and Presser

(57) ABSTRACT

An electronic device is configured to acquire image data containing a test pattern including first and second patterns intersecting with each other. Pixels corresponding to the test pattern are determined by comparing brightness of each pixel with a threshold value, and widths of an overlapped image of the first and second patterns in an orthogonal direction at a plurality of different positions in the reference direction are calculated. Intersecting positions of the first pattern and the second pattern in the test pattern is detected based on a distribution of widths at the plurality of different positions. The test pattern has a model pattern having a set width in the orthogonal direction separate from the first and second patterns. The pixels corresponding to the test pattern are determined based on a threshold value, and widths at the plurality of positions of the overlapped image in the reference direction are calculated.

28 Claims, 20 Drawing Sheets

(51) Int. Cl.
    *B41J 2/04*      (2006.01)
    *H04N 1/00*      (2006.01)
    *B41J 29/38*     (2006.01)
    *B41J 11/46*     (2006.01)
    *B41J 13/00*     (2006.01)
    *B41J 2/21*      (2006.01)

(52) U.S. Cl.
    CPC ........... *B41J 11/46* (2013.01); *B41J 13/0027* (2013.01); *B41J 29/38* (2013.01); *H04N 1/00045* (2013.01); *H04N 1/00408* (2013.01); *H04N 1/00588* (2013.01); *H04N 2201/0094* (2013.01)

(58) Field of Classification Search
    CPC ........ B41J 2/2139; B41J 29/38; B41J 29/393; B41J 2/2125; B41J 2/2142; B41J 2/14; G06K 15/027; H04N 1/0045; H04N 1/00408; H04N 1/00588; H04N 2201/0094
    See application file for complete search history.

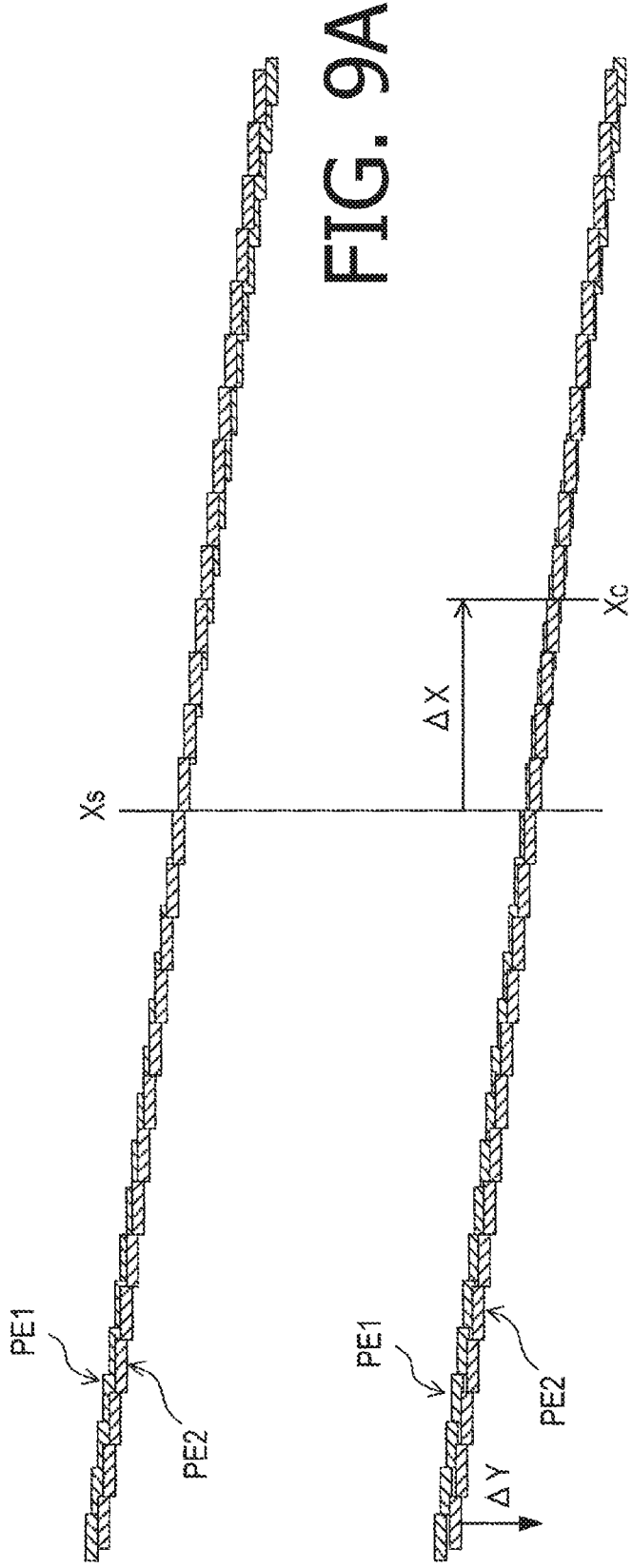

ELECTRONIC DEVICE USING TEST PATTERN, METHOD OF ANALYZING TEST PATTERN, AND NON-TRANSITORY RECORDING MEDIUM STORING INSTRUCTIONS TO ANALYZE TEST PATTERN

CROSS-REFERENCE TO RELATED APPLICATIONS

This application claims priority under 35 U.S.C. § 119 from Japanese Patent Application No. 2017-008915 filed on Jan. 20, 2017. The entire subject matter of the application is incorporated herein by reference.

BACKGROUND

Technical Field

The present disclosures relate to an electronic device using a test pattern, a method of analyzing the test pattern, and a non-transitory recording medium storing computer-readable instructions to analyze the test pattern employed in the electronic device.

Related Art

There has been known an image forming system configured to form a test pattern on a sheet. The test pattern is formed in order to suppress a control error when an image is formed on a sheet, for example, an error in conveying the sheet. By suppressing the conveying error of the sheet, quality of an image formed on the sheet is improved. As the image forming system employing such a test pattern, there has been known serial printers such as an inkjet printer or a dot-impact printer, or electrophotographic page printers such as a laser printer or an LED printer.

SUMMARY

As a test pattern forming method, there is known a method to form a first pattern on a sheet, and then, repeatedly execute an operation to convey the sheet minutely and form a second pattern on the sheet. The conveying error is determined based on an overlapping state of the second pattern which is formed at every minute conveyance with respect to the first pattern.

There is known another test pattern forming method which is employed in an inkjet printer. According to this method, among all of nozzle groups a recording head (i.e., an inkjet head) has, a most upstream side nozzle group in the sheet conveying direction is used to for the first pattern extending in a main scanning direction. Then, after the sheet is conveyed by a particular amount, a most downstream side nozzle group is used to form a second pattern, an extending direction of the second pattern is inclined with respect to the main scanning direction. In this case, the first pattern is formed by a plurality of dots which are linearly arranged in the main scanning direction. Further, the second pattern is formed such that a plurality of dot lines, each of which has a particular length and extends in the main scanning direction, are inclined with respect to the main scanning direction so that the plurality of dot lines are arranged stepwise. The conveying error is determined based on the overlapping state of the first pattern and the second pattern.

According to the conventional technique, however, it is difficult to form the test patterns quickly (e.g., without minutely conveying the sheet), and determine the control error at high accuracy based on such test patterns. In consideration of the above, it is preferable that test patterns are formed quickly, and the control error can be determined accurately based on such quickly formed test patterns according to a novel analyzing technique.

According to aspects of the disclosures, there is provided an electronic device having an image acquiring device configured to acquire image data, and a controller. The controller is configured to execute causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other, determining pixels corresponding to the test pattern by comparing brightness of each pixel indicated by the image data with a threshold value, and calculating widths of overlapped image of the first pattern and the second pattern in an orthogonal direction being orthogonal to the reference direction, at a plurality of different positions in the reference direction, and detecting intersecting positions of the first pattern and the second pattern in the test pattern based on a distribution of widths at the plurality of different positions. The test pattern includes a model pattern having a set width in the orthogonal direction separate from the first pattern and the second pattern. Further, in calculating, the controller sets the threshold value with which the width of the model pattern in the orthogonal direction calculated from the image data fits the set width, determines the pixels corresponding to the test pattern based on the set threshold value, and calculates widths at the plurality of positions of the overlapped image in the reference direction.

According to aspects of the disclosures, there is provided an electronic device having an image acquiring device configured to acquire image data, and a controller. The controller is configured to execute causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other, calculating widths of an overlapped image of the first pattern and the second pattern of the test pattern in an orthogonal direction being orthogonal to the reference direction at a plurality of different positions in the reference direction based on the image data, and detecting intersecting positions of the first pattern and the second pattern in the test pattern based on a distribution of widths at the plurality of different positions. The test pattern includes a model pattern having a set width in the orthogonal direction separate from the first pattern and the second pattern. Further, in calculating, the controller compensates each of the widths of the overlapped image at the plurality of positions calculated from the image data based on an error between the width of the model pattern calculated from the image data and the set width of the model pattern. Furthermore, in detecting, the controller detects the intersecting position based on the distribution of the widths at the plurality of positions after compensation.

According to aspects of the disclosures, there is provided an electronic device having an image acquiring device configured to acquire image data, and a controller. The controller is configured to execute causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other, calculating, based on the image data, widths of an overlapped image of the first pattern and the second pattern in an orthogonal direction being orthogonal to the reference direction at a plurality of different positions in the reference direction, and detecting intersecting positions of the first pattern and the second pattern in the test pattern based on a distribution of widths at the plurality of different positions. In calculating, the controller calculates each of the widths at the plurality of positions by calculating, for each group in which the widths in design in the orthogonal direction are the same, an average value of the widths in the orthogonal direction at pixel positions along the reference direction within the group or a central value of the widths in the orthogonal direction at pixel positions along the reference direction within the group, and obtaining the widths at the plurality of positions as the evaluation values, respectively, by calculating, for each of the areas corresponding to the plurality of positions, evaluation value for a group of the widths, in the orthogonal direction, of the overlapped image in the area when the overlapped image is shaped so that the width, in the orthogonal direction, of each group with the average value or the central value.

According to aspects of the disclosures, there is provided an electronic device having an image acquiring device configured to acquire image data, and a controller. The controller is configured to execute causing the image acquiring device to acquire the image data representing an image formed on a sheet, the image containing a test pattern including a first pattern and a second pattern, the first pattern being configured such that a plurality of first blocks each having a first length $W1$ in a reference direction are arranged in a first direction, the first direction being inclined with respect the reference direction at an acute angle, the second pattern being configured such that a plurality of second blocks each having a second length $W2$ longer than the first direction in the reference direction are arranged in a second direction, the second direction being inclined at an angle within an angle range formed between the reference direction and the first direction, the first pattern and the second pattern intersecting with each other, calculating, based on the image data, widths of an overlapped image of the first pattern and the second pattern in an orthogonal direction being orthogonal to the reference direction at a plurality of different positions in the reference direction, and detecting intersecting positions of the first pattern and the second pattern in the test pattern based on a distribution of widths at the plurality of different positions. Each of the widths at the plurality of positions is calculated as an evaluation value of a group of widths, in an orthogonal direction being orthogonal to the reference direction, of the overlapped image at respective pixel positions along the reference direction within an area, the area being centered around each of the plurality of positions and including a particular number of pixels in the reference direction. Further, the test pattern is configured such that a relative position between the first pattern and the second pattern varies in the orthogonal direction when the test patter is formed on the sheet due to individual difference of an image forming system configured to form the test pattern on the sheet. In calculating, the controller calculates, as the evaluation value for each of the plurality of positions, one of an evaluation value for a group of the widths, in the orthogonal direction, of the overlapped image at the pixel positions along the reference direction within the area including the number of pixels corresponding to the second length $W2$ in the reference direction, the area centered around each of locations arranged at every first interval in the reference direction from a base point, the base point being a location defined along the reference direction, the base point being a location in the reference direction at which end sides extending in the orthogonal direction of the first block and the second block being aligned in the orthogonal direction, and an evaluation value for a group of the widths, in the orthogonal direction, of the overlapped image at the pixel positions along the reference direction within the area including pixels the number of which corresponding to the first length $W1$ in the reference direction, the area centered around each of locations arranged at every second interval in the reference direction from the base point. Furthermore, each of the first length $W1$ and the second length $W2$ is integer multiple of a unit length in the reference direction, a difference between the second length $W2$ and the first length $W1$ coincides with a greatest common facture of the first length $W1$ and the second length $W2$, the first interval is the first length $W1$, and the second interval is the second length $W2$.

According to aspects of the disclosures, there is provided an electronic device having an image acquiring device configured to acquire image data, and a controller. The controller is configured to execute causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other, calculating, based on the image data, widths of an overlapped image of the first pattern and the second pattern in an orthogonal direction being orthogonal to the reference direction at a plurality of different positions in the reference direction, and detecting intersecting positions of the first pattern and the second pattern in the test pattern based on a distribution of widths at the plurality of different positions. In detecting, the controller moves the model curve in the reference direction with respect to the distribution of the widths at the plurality of positions in the reference direction, calculates each of a plurality of displaced amounts between the distribution of the widths at the plurality of positions and the model curve, and detects a position in the reference direction at which the model curve arranged at a position where the smallest displaced amount being the smallest in the calculated plurality of displaces amounts is calculated exhibits an extreme value as the intersection position.

According to aspects of the disclosures, there is provided an electronic device having an image forming device configured to form an image on a sheet with moving a recording head in a main scanning direction and conveying the sheet in an auxiliary scanning direction orthogonal to the main scanning direction, an optical sensor configured to optically read the image on the sheet and generate read image data representing the image on the sheet, and a controller configured to control the image forming device and the optical sensor. The controller is configured to execute causing the optical sensor to obtain the read image data containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other, determining pixels corresponding to the test pattern by comparing brightness of each pixel indicated by the read image data with a threshold value, calculating widths of overlapped image of the first pattern and the second pattern in an orthogonal direction to the reference direction at a plurality of different positions in the reference direction, detecting intersecting positions of the first pattern and the second pattern in the test pattern based on a distribution of widths at the plurality of different positions, the test pattern having a model pattern having a set width in the orthogonal direction separate from the first pattern and the second pattern, setting the threshold value with which the width of the model pattern in the orthogonal direction calculated from the read image data fit the set width, determining the pixels corresponding to the test pattern based on the set threshold value, calculating widths at the plurality of positions of the overlapped image in the reference direction, controlling the image forming device to test pattern by forming the first pattern on the sheet and forming the second pattern on the sheet with a sheet conveying operation being executed therebetween, and compensating a conveying amount of the sheet between the formation of the first pattern and the formation of the second pattern based on the detected intersection position.

BRIEF DESCRIPTIONS OF THE ACCOMPANYING DRAWINGS

FIG. 1 is a block diagram schematically showing functional configuration of an MFP according to an embodiment of the present disclosures.

FIG. 2 schematically shows a cross-sectional side view of a sheet conveyer at a portion around a recording head.

FIGS. 9A and 9B show an enlarged view of an intersecting patterns.

DETAILED DESCRIPTION OF THE ILLUSTRATIVE EMBODIMENT

Hereinafter, referring to the accompanying drawings, an illustrative embodiment according to the present disclosures will be described.

Figure 1:
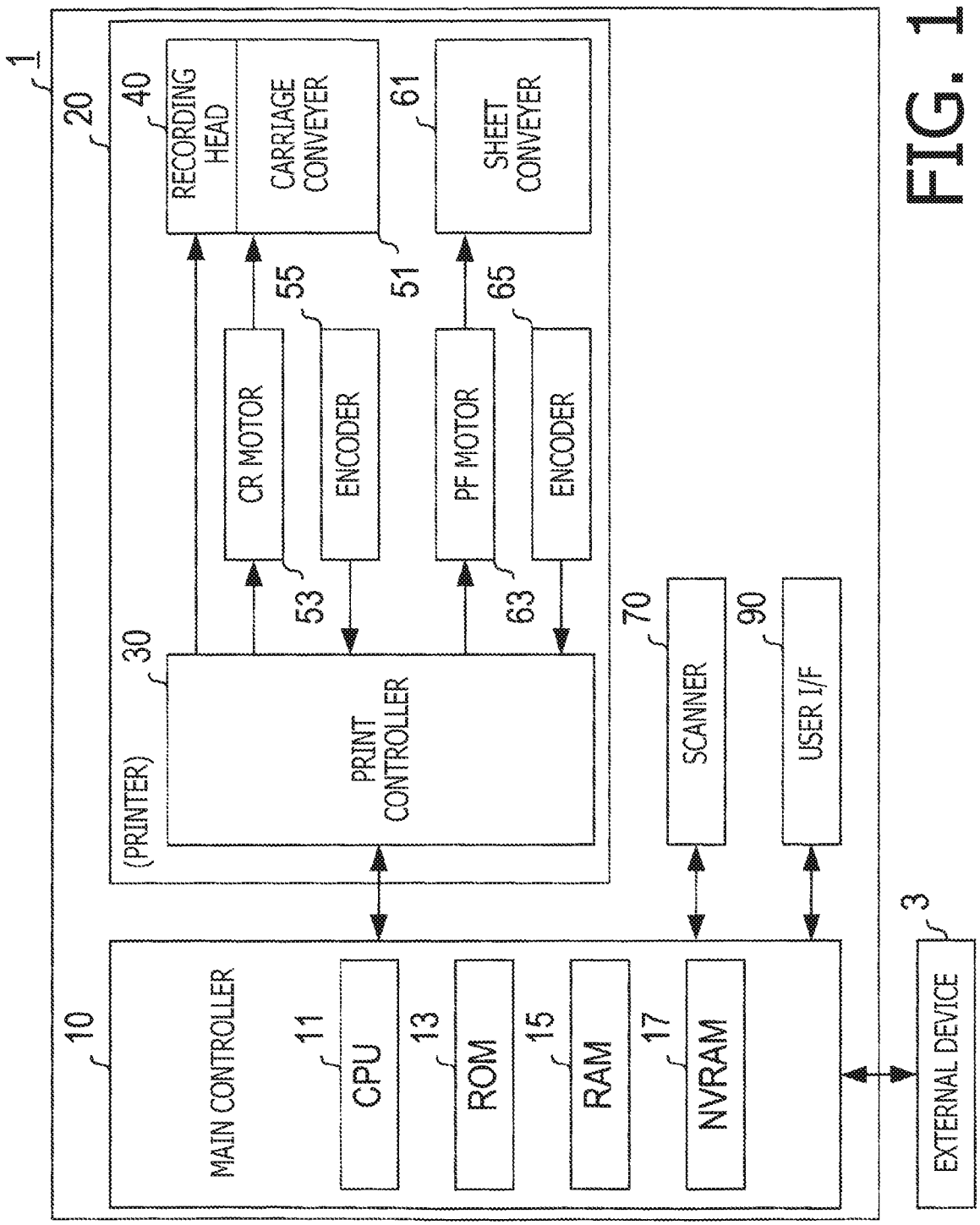

A digital MFP (hereinafter, simply referred to as MFP) 1 according to the illustrative embodiment of the present disclosures has, as shown in FIG. 1, a main controller 10, a printer 20, a scanner 70 and a user I/F 90. The main controller 10 controls an entire operation of the MFP 1 to make the MFP 1 function as a printing device, a scanning device and a copying device. The main controller 10 includes a CPU 11, a ROM 13, a RAM 15 and an NVRAM 17.

The CPU 11 executes processes in accordance with programs stored in the ROM 13 to realize the above functions. The RAM 15 is used as a work area when the CPU 11 executes the programs. The NVRAM 17 is an electrically rewritable non-volatile memory, and configured by a flash memory or an EEPROM. The main controller 10 further includes a not-shown communication interface which is configured to communicate with an external device 3. It is noted that an example of the external device 3 includes a personal computer.

The printer 20 is controlled by the main controller 10 and form an image on a sheet Q. The printer 20 is configured as the inkjet printer. The printer 20 forms an image on the sheet Q based on image data representing, for example, data received from the external device 3, or an image on an original read by the scanner 70 (hereinafter, referred to as a read image). The printer 20 is further controlled by the main controller 10 and forms a test pattern used to determine the conveying error of the sheet Q.

The scanner 70 is configured as a flatbed type scanner. The scanner 70 is controlled by the main controller 10, optically reads the original placed on an original table, and inputs the image data representing the read image to the main controller 10. The user I/F 90 includes a display configured to display various pieces of information for the user, and an input device configured to acquire an instruction by the user. The input device may include mechanical key switches or a touch sensor on the display.

The printer 20 includes a print controller 30, a recording head 40, a carriage conveyer 51, a CR motor 53, a linear encoder 55, a sheet conveyer 61, a PF motor 63 and a rotary encoder 65.

The print controller 30 controls, in accordance with instructions from the main controller 10, ejection of ink droplets from the recording head 40, conveying of the carriage 52 (see FIG. 2), and conveying of the sheet Q. The print controller 30 is configured, for example, by an ASIC.

The recording head 40 is a well-known inkjet head. The recording head 40 is controlled by the print controller 30 and ejects the ink droplets to form an image on the sheet Q. The recording head 40 has ink ejection nozzles on a lower surface of the head 40, facing the sheet Q. Concretely, the recording head 40 has a group of ejection nozzles arranged in an auxiliary scanning direction. The auxiliary scanning direction corresponds to a conveying direction of the sheet Q, which also corresponds to a Y-axis direction in FIG. 2. The main scanning direction corresponds to a direction orthogonal to the auxiliary scanning direction. The main scanning direction also corresponds to a conveying direction of the carriage 52 (i.e., a direction orthogonal to a plane of FIG. 2, or an X-axis direction in FIG. 2). In the following description, the group of ejection nozzles provided to the recording head 40 will be referred to as a nozzle group NO.

The carriage conveyer 51 has the carriage 52 mounting the recording head 40, and configured to convey the carriage 52 in the main scanning direction. The CR motor 53 is a driving source of the carriage conveyer 51, and is configured by a direct current motor. The CR motor 53 is controlled by the print controller 30. A conveyance control of the carriage 52 is realized as the print controller 30 controls rotation of the CR motor 35.

The linear encoder 55 generates an encoder signal based on a pulse signal corresponding to displacement of the carriage 52 in the main scanning direction and transmits the encoder signal to the print controller 30. The print controller 30 detects a position and a speed, in the main scanning direction, of the carriage 52 based on the encoder signal transmitted from the linear encoder 55, and performs a feedback control of the position and the speed of the carriage 52. The print controller 30 controls the recording head 40 in accordance with movement of the carriage 52 such that the recording head 40 intermittently ejects the ink droplets to the sheet Q while the recording head 40 moves relative to the sheet Q, thereby forming a desired image on the sheet Q.

Figure 2:
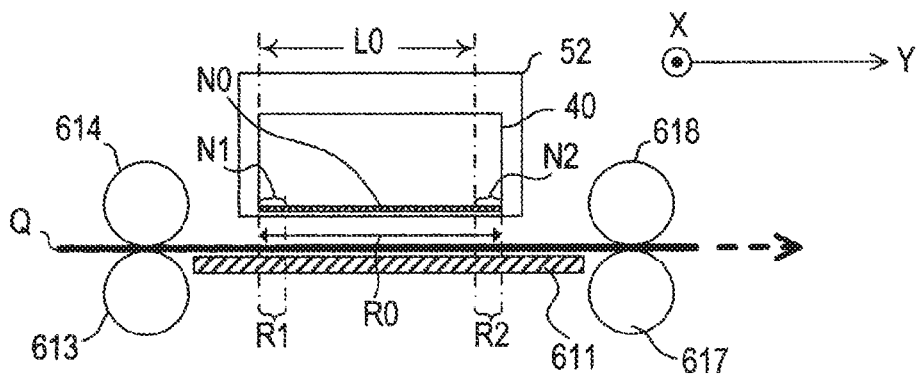

The sheet conveyer 61 is configured to covey the sheet Q from a sheet feed tray (not shown) to a discharge tray (not shown). FIG. 2 shows a part of the sheet conveyer 61, a portion around the recording head 40. The sheet conveyer 61 has, as shown in FIG. 2, a platen 611 below the recording head 40. The sheet conveyer 61 further includes, on an upstream side with respect to the platen 611, a conveying roller 613 and a pinch roller 614, which are arranged to face each other, and on a downstream side with respect to the platen 611, a discharge roller 617 and a spur roller 618, which are arranged to face each other.

The conveying roller 613 and the discharge roller 617 are connected to the PF motor 63 through a not-shown transmission mechanism, and receives a driving force from the PF motor 63 to rotate synchronously. The PF motor 63 is a driving source of the sheet conveyer 61 and is configured by a direct current motor.

The sheet conveyer 61 is configured such that, the sheets Q placed on the feed tray are separated one by one and fed as the feed roller (not shown) rotates, and the thus separated sheet Q is conveyed to a nip between the conveying roller 613 and the pinch roller 614. The conveying roller 613 is driven to rotate by the PF motor 63, and conveys the sheet Q supplied from the feed tray toward a downstream side, in the sheet conveying direction, which is indicated by arrowed broken line in FIG. 2. The conveying roller 613 rotates to convey the sheet Q toward the downstream side with nipping the sheet Q between the conveying roller 613 and the pinch roller 614.

The sheet Q conveyed toward the downstream side by the rotation of the conveying roller 613 passes a recording area R0 below the recording head 40. The sheet Q passed the recording area R0 is nipped between the discharge roller 617 and the spur roller 618, and conveyed further toward the downstream side by the rotation of the discharge roller. The sheet Q passed the discharge roller 617 is discharged onto the discharge tray.

The rotary encoder 65 is provided to a rotary shaft of the conveying roller 613 or a rotary shaft of the PF motor 63, or provided in the driving force transmission path from the PF roller to the conveying roller 613, and transmits the pulse signal corresponding to the rotation of the conveying roller 613 to the print controller 30 as the encoder signal.

The print controller 30 detects a rotation amount, a rotation speed and a rotation phase φ of the conveying roller 613 based on the encoder signal transmitted from the rotary encoder 65. The rotation phase φ corresponds to a rotation angle φ (0≤φ<2Π) of the conveying roller 613 within a range of 0 to 2H when one rotation of the conveying roller 613 is represented by 2Π.

The main controller 10 stores a control parameter group corresponding to an individual difference of the printer 20 in the NVRAM 17. The main controller 10 controls the printer 20 appropriately, based on the control parameter group stored in the NVRAM 17. Specifically, the main controller 10 adapt the operation of the print controller 30 to the individual different by setting the parameter group defining the operation of the print controller to the print controller 30 based on the control parameter group stored in the NVRAM 17, thereby controlling the printer 20 appropriately.

The print controller 30 execute controlling of the CR motor 53 and the PF motor 63 based on the parameter group set by the main controller 10 based on the encoder signal transmitted from the linear encoder 55 and the rotary encoder 65. According to the illustrative embodiment, by cooperation of the main controller 10 and the print controller 30, an ejection control of the ink droplets from the recording head 40, the conveying control of the carriage 52 mounting the recording head 40 and conveying control of the sheet Q are realized.

Specifically, the control parameter group stored in the NVRAM 17 includes parameters indicating correspondence between the rotation amount and the rotation phase of the conveying roller 613 and the sheet conveying amount. The main controller 10 sets the parameter group, which is adjusted to suppress the control error including the conveying error of the sheet Q, based on the control parameter group. For example, the main controller 10 calculates a target rotation amount of the conveying roller 613 corresponding to a target sheet conveying amount, and sets the calculated parameter representing the target rotation amount of the conveying roller 613. According to this setting, the sheet conveyance by the conveying roller 613 is realized with suppressing the conveying error due to decentering or difference in shape of the conveying roller 613.

The main controller 10 compensates the above-described control parameter value representing the correspondence between the rotation amount and the rotation phase of the conveying roller 613 and the sheet conveying amount based on a formation result of the test patter. The control parameter is set to a standard value without taking individual differences into consideration, and is changed to a value corresponding to the individual difference based on the formation result of the test pattern.

Figure 3A:
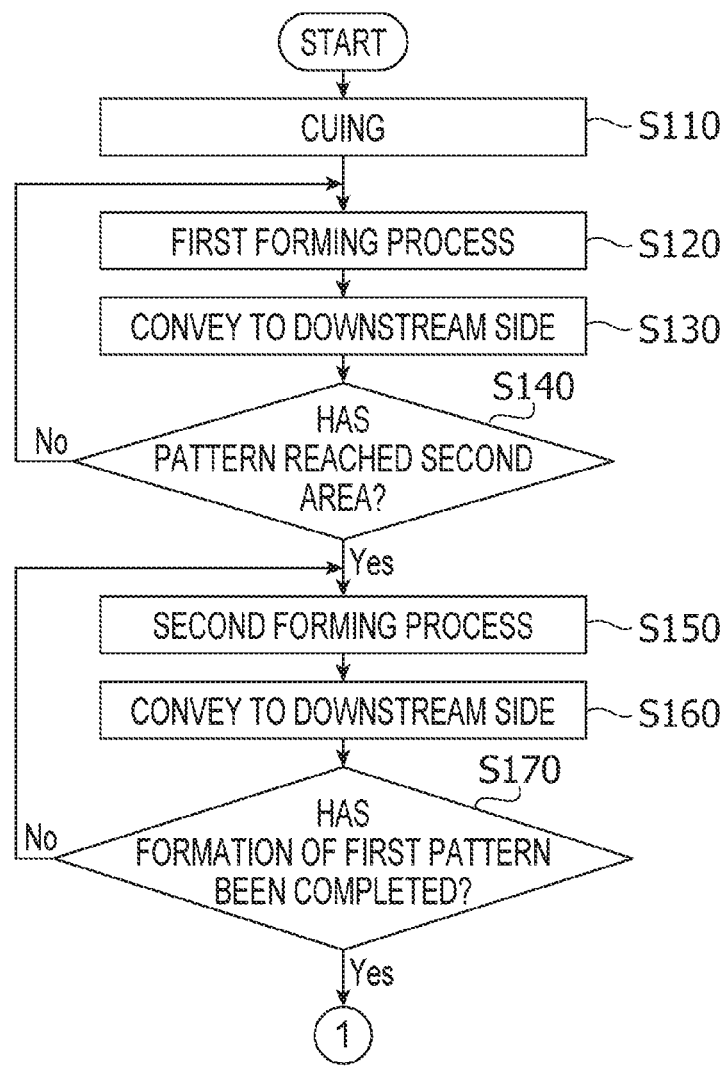
FIGS. 3A and 3B show a flowchart illustrating a test printing process executed by the main controller.
Figure 3B:
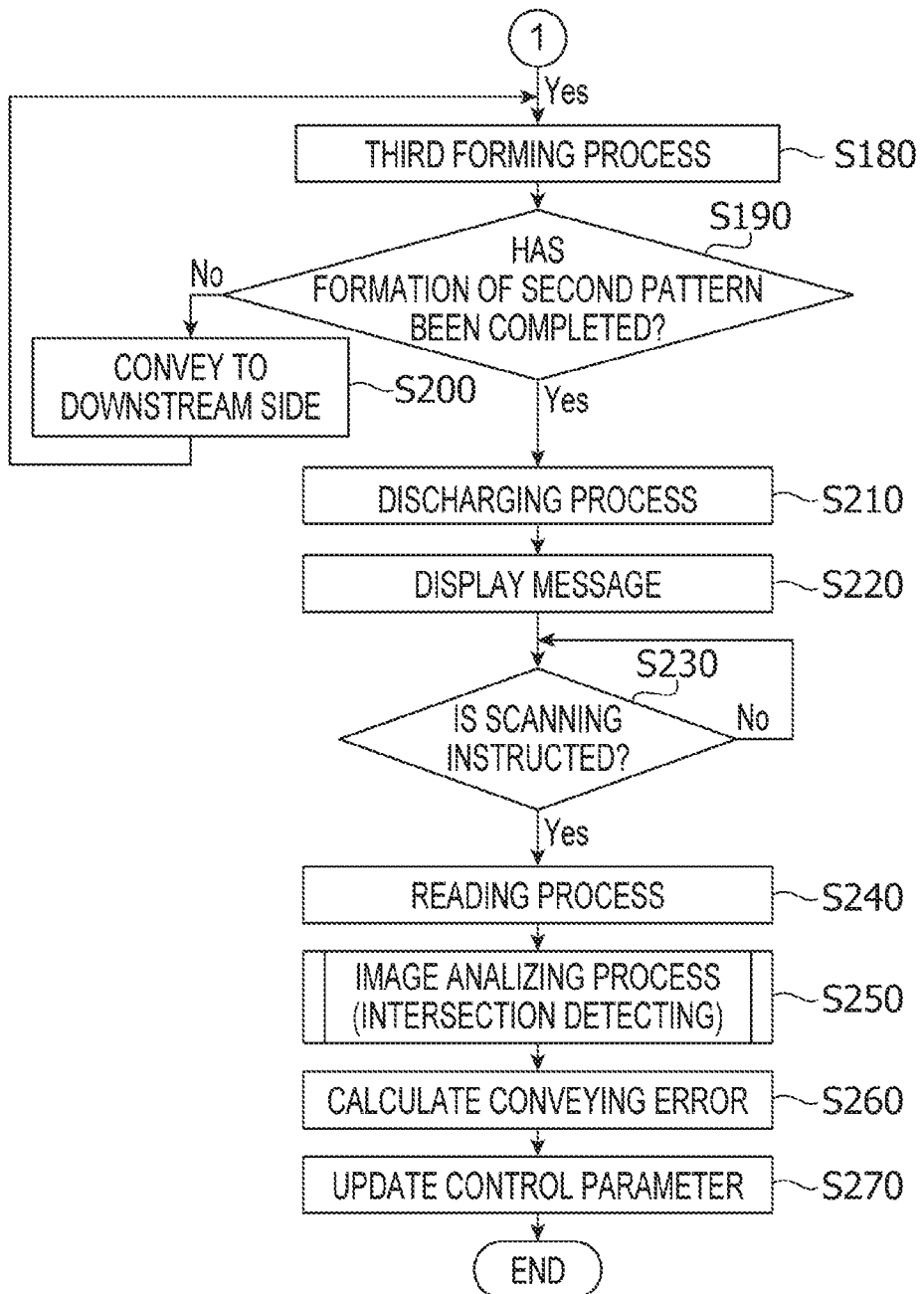

When a print instruction of a test pattern is received through the user I/F 90 or from the external device 3, the main controller 10 executes a test printing process shown in FIG. 3 in accordance with a program stored in the ROM 13. For example, a user using an MFP 1 can input the print instruction, or a worker of a manufacturer of the MFP 1 can input, before shipment of the MFP 1, the print instruction of the test pattern by operating the user I/F 90 or the external device 3. An example of the test pattern formed on the sheet Q in response to the test printing process is shown in FIG. 4.

Figure 4:
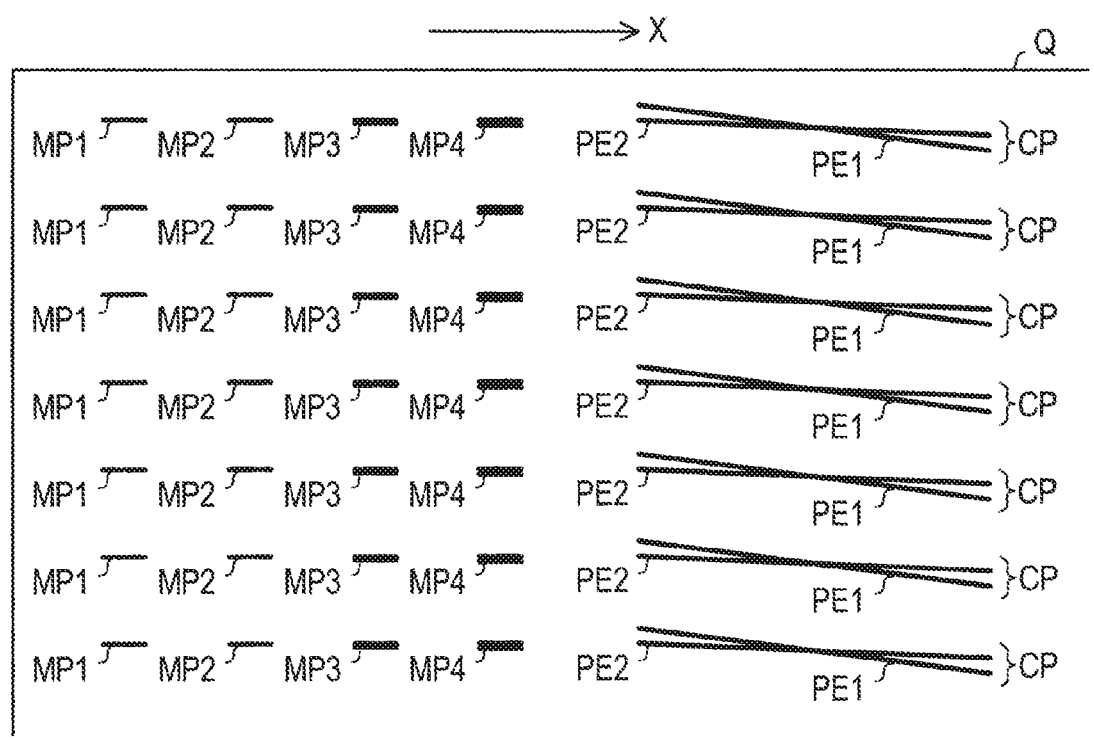
FIG. 4 shows an example of a test pattern.

The test pattern shown in FIG. 4 includes intersecting patterns CP in each of which a first pattern PE1 and a second pattern PE2 intersect with each other, and a plurality of model patterns MP1, MP2, MP3 and MP4. The test pattern includes a plurality of pattern sets arranged in the auxiliary scanning direction, each pattern set including the intersecting pattern CP and the plurality of model patterns MP1, MP2, MP3 and MP4 are arranged in the main scanning direction. The intersecting pattern CP mainly used to detect the conveying error of the sheet Q, and the model patterns MP1, MP2, MP3 and MP4 are used to improve a detection accuracy of the conveying error.

The pattern set shown in FIG. 4 includes only one intersecting pattern CP in the main scanning direction. However, the pattern set may include a plurality of intersecting patterns CP in the main scanning direction. So are the model patterns MP1, MP2, MP3 and MP4. The intersecting pattern CP and the model patterns MP1, MP2, MP3 and MP4 shown in FIG. 4 are only examples, and arrangement distances, lengths, and arrangement order may be determined arbitrarily.

When the test printing process shown in FIG. 3 is started, the main controller 10 causes, through the print controller 30 controlling the PF motor 63, the sheet conveyer 61 to convey the sheet Q to the recording area R0 below the recording head 40 with causing (S110).

Thereafter, the main controller 10 executes a first forming process (S120). In the first forming process, the main controller 10 causes, through the print controller 30, the recording head 40 to form a partial image of the test pattern on the sheet Q with use of the first nozzle group N1. In this process, among the nozzle groups NO provided to the recording head 40, only the first nozzle group N1 is used for image formation. In this process, as the ink droplets are ejected from the first nozzle group N1, on a portion of the sheet Q located at the first recording area R1, the first pattern PE1 and the model patterns MP1, MP2, MP3 and MP4 are formed (S120).

As shown in FIG. 2, the first nozzle group N1 corresponds to the nozzle group located on the upstream side, in the sheet conveying direction, within the nozzle group N0. The first recording area R1 corresponds to an area, within the recording area R0, below the first nozzle group N1 in which an image can be formed by the first nozzle group N1. The recording area R0 corresponds to the area below the nozzle group N0 provided to the recording head 40. A second nozzle group N2 shown in FIG. 2 corresponds to the nozzle group on the downstream side with respect to the first nozzle group N1 in the sheet conveying direction within the nozzle group N0. A second recording area R2 corresponds to an area below the second nozzle group N2, within the recording area R0, where an image can be formed by the second nozzle group N2.

Figure 5:
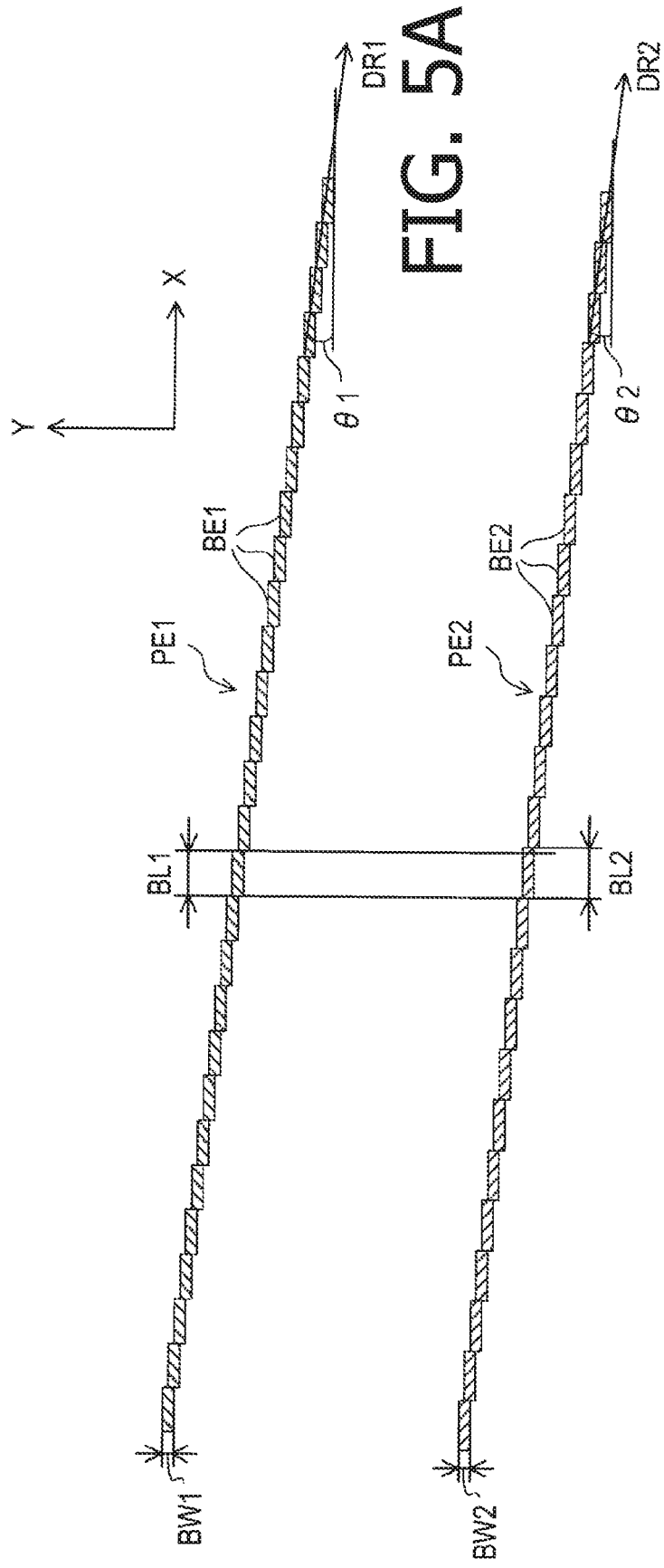
FIGS. 5A and 5B show an enlarged view of a first pattern and a second patter.

The first pattern PE1 formed on the sheet Q using the first nozzle group N1 is, in a microscopic view, a stepwise pattern as shown in FIG. 5A. Concretely, the first pattern PE1 is configured such that rectangular blocks BE1 each having a first length BL1 in the main scanning direction (i.e., in the X-axis direction in FIG. 5A) are arranged along a direction DR1 which is inclined at an acute angle of θ1 with respect to the main scanning direction.

Every two blocks BE1 next to each other in the main scanning direction are arranged to contact each other, and every two blocks BE1 next to each other are formed to be shifted in the auxiliary scanning direction (i.e., the Y-axis direction in FIG. 5A) by half a width BW1, which is a length of the side of the block BE1 along the auxiliary scanning direction. Each of the blocks BE1 is formed such that a plurality of dot arrays, each including a plurality of dots arranged in the main scanning direction, are arranged in parallel in the auxiliary scanning direction. It is noted that the dot is a minimum unit of the image the printer 20 can form on the sheet Q. The first patterns PE1 are, as shown in FIG. 4, linear test patterns slightly inclined with respect to the main scanning direction in the macroscopic view.

In the following description, an XY orthogonal coordinate system on a surface of the sheet Q will be referred to. The XY orthogonal coordinate system has the X-axis in the main scanning direction, and the Y-axis in the sheet conveying direction, or the auxiliary scanning direction. Sign (positive/negative) of each of the X-axis and the Y-axis can be determined arbitrarily. In the following description, formally, the positive direction of the Y-axis is defined to be the downstream side in the sheet conveying direction, and the positive direction of the X-axis direction is defined to be a right side with respect to the positive direction of the Y-axis.

Further, according to the following description, the Y coordinate is defined by a unit of a dot. That is, a unit length of the Y-axis is defined by an interval, in the auxiliary scanning direction, of dots which can be formed on the sheet Q. Such an interval will be referred to as a dot pitch. The dot pitch corresponds to the interval of the nozzles of the recording head 40 in the auxiliary scanning direction. The X coordinate will also be defined by a unit of dot. That is, a unit length of the X-axis is defined by an interval, in the main scanning direction, of dots which can be formed on the sheet Q (i.e., the dot pitch in the main scanning direction). The unit length of the X-axis corresponds to the nozzle interval of the recording head in the main scanning direction.

A typical inkjet printer is configured such that a resolution in the main scanning direction is higher than the resolution in the auxiliary scanning direction. For example, there is known an inkjet printer which is configured such that the resolution in the main scanning direction is 600 dpi, while the resolution in the auxiliary scanning direction is 300 dpi. In the MFP 1 according to the illustrative embodiment, the resolution in the main scanning direction is higher than the resolution in the auxiliary scanning direction, and the dot pitch in the main scanning direction is smaller than the dot pitch in the auxiliary scanning direction. The above means that, when the test pattern is formed, a degree of freedom in the main scanning direction is higher than a degree of freedom in the auxiliary scanning direction. According to the illustrative embodiment, with use of the difference of the resolutions in the main scanning direction and the auxiliary scanning direction, the intersecting patter CP in which the first pattern PE1 and the second pattern PE2 intersect at a relatively small angle is generated.

Figure 6:
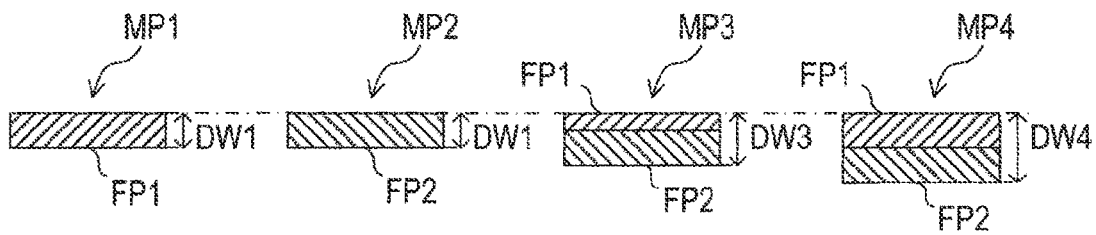
FIG. 6 is an enlarged view of model patterns.
Figure 7A:
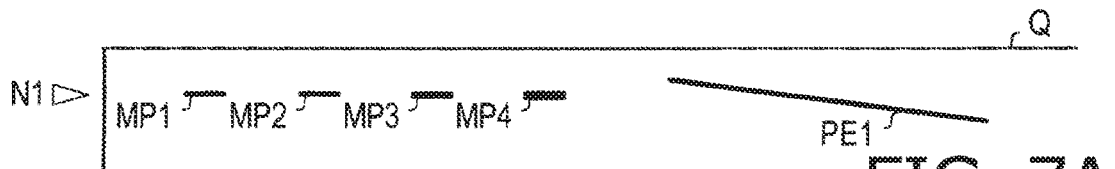
FIGS. 7A-7D and 8A-8B show a process of forming a test pattern.
Figure 7B:
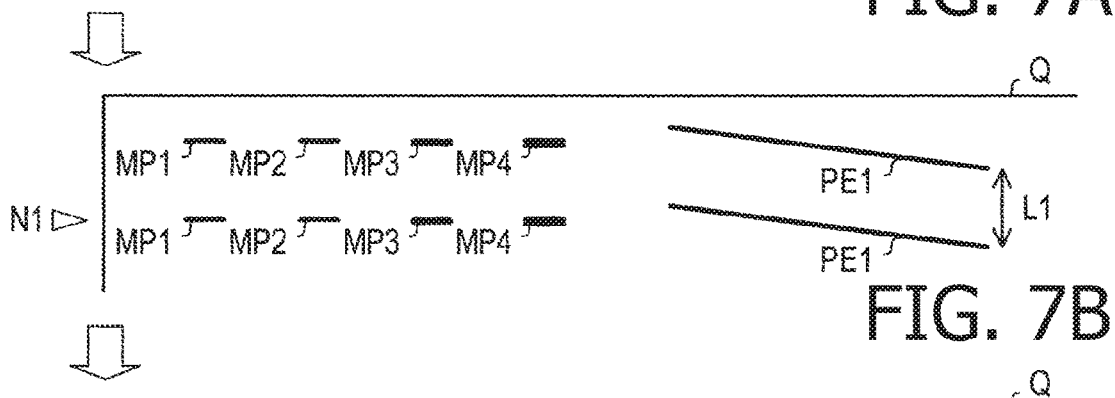
Figure 7C:
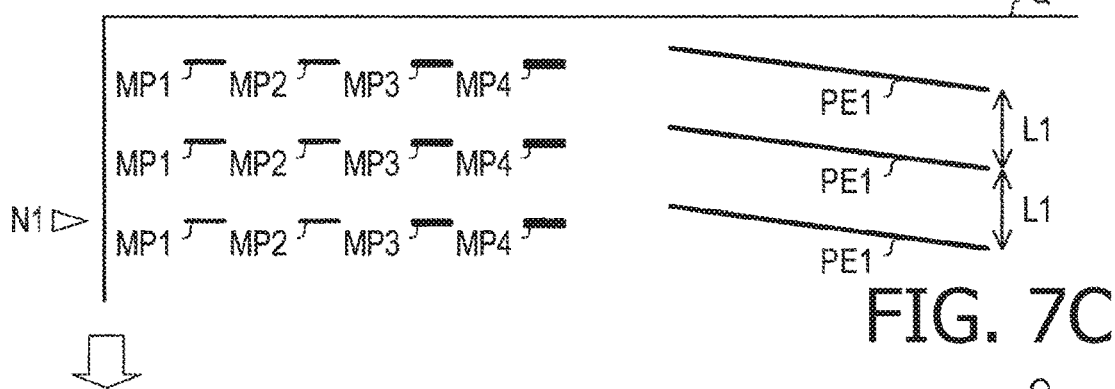
Figure 7D:
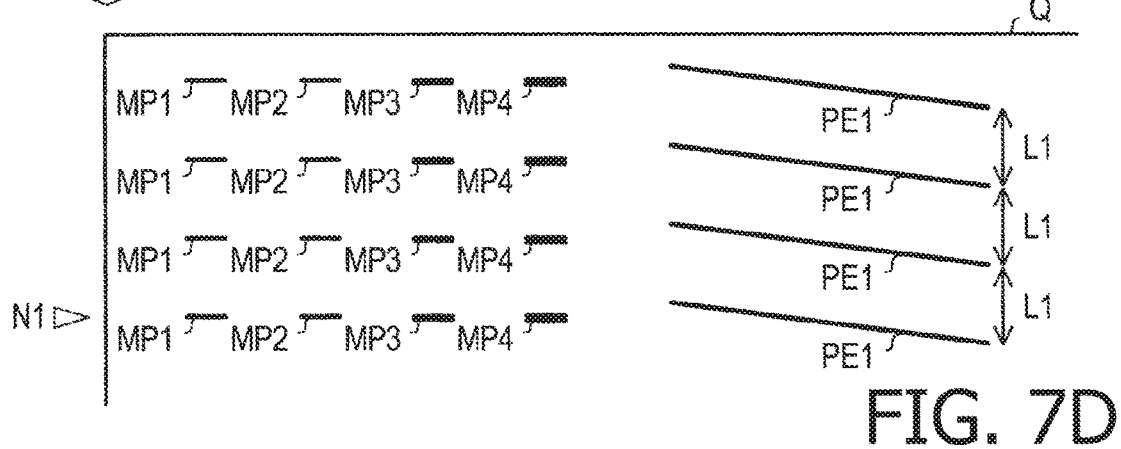

The model patterns MP1, MP2, MP3 and MP4 formed on the sheet Q in the first forming process (S120) is configured as shown in FIG. 6. The first model pattern MP1 is a pattern modeling the block BE1 which is a component of the first pattern PE1, and state in which the first pattern PE1 and the second pattern PE2 do not overlap. A width DW1 in the Y-axis direction of the model pattern MP1 is the same width W0 of a width BW1 of the block BE1. The first model pattern MP1 is formed on the sheet Q in the first forming process (S120) same as the block BE1. It is noted, however, the length of the model pattern MP1 in the X-axis direction is not necessarily be the length BL1 of the block BE1.

The second model pattern MP2 is a pattern modeling a first state around an intersection between the first pattern PE1 and the second pattern PE2 of the intersecting pattern CP, and a state in which the first pattern PE1 and the second pattern PE2 overlap. Concretely, the model pattern MP2 is formed by completely overlapping two rectangular patterns FP1 and FP2, which have the same widths DW1=W0, the patterns FP1 and FP2 modeling the block BE1 which is a component of the first pattern PE1, and the block BE2, which is a component of the second pattern PE2. Although details will be described later, the second pattern PE2 includes, as shown in FIG. 5B, the block BE2 as a component, and the blocks BE2 are arranged stepwise as in the first pattern PE1. The block BE2 is different from the block BE1 only by the length in the main scanning direction, and the width BW2 in the auxiliary scanning direction is the same as the width of the block BE1 which is W0.

In FIG. 6, the rectangular pattern FP1 modeling the block BE1 is indicated by hatching with line segments inclining from upper right to lower left, while the rectangular pattern FP2 modeling the block BE2 is indicated by hatching with line segments inclining from upper left to lower right. It is noted that the rectangular patterns FP1 and FP2 do not necessarily have the same lengths BL1 and BL2 of the blocks BE1 and BE2, respectively. In the example shown in FIG. 6, the lengths of the rectangular patterns FP1 and FP2 are the same, and the substances of the rectangular patterns FP1 and FP2 are the patterns of the same shapes.

As a result that the rectangular pattern FP2 modeling the block BE2 is formed on the sheet Q so as to completely overlap the rectangular pattern FP1 modeling the block BE1, in FIG. 6, only the rectangular pattern FP2 modeling the block BE2 is indicated as a model pattern MP2.

The model pattern MP2 can be formed by causing the recording head 40 to reciprocate in the main scanning direction with causing the recording head 40 to form the rectangular pattern FP1 in a forward path, and the rectangular pattern FP2 in a return path. Alternatively, the recording head 40 may be reciprocated twice in the main scanning direction, the recording head 40 caused to form the rectangular pattern FP1 in the first forward or return path, while the rectangular pattern FP2 in the second forward or return path.

The third model pattern MP3 is a pattern modeling a second state about the intersection between the first patter PE1 and the second pattern PE2 in the intersecting pattern CP. About the intersection, a state where the blocks BE1 and BE2 completely overlap in the auxiliary scanning direction is included, and further a state where the blocks BE1 and BE2 partially overlap in the auxiliary scanning direction. The model pattern MP3 shows the state where the blocks BE1 and BE1 partially overlap.

The model pattern MP3 is formed such that the rectangular pattern FP2 modeling the block BE2 is overlapped on the rectangular pattern FP1 modeling the block BE1 with being displaced in the auxiliary scanning direction by half the width DW1. Similar to the model pattern MP2, the model pattern MP3 is formed by reciprocating the recording head 40 in the main scanning direction with the sheet Q being unmoved. The model pattern MP3 can be formed by changing a half of the nozzle group used to eject the ink droplets when the rectangular pattern MP1 is formed and the nozzle group used to eject the ink droplets when the rectangular pattern MP2 is formed. That is, the model pattern MP3 is formed such that, when the rectangular pattern FP2 is formed, part of the same nozzles used to form the rectangular pattern FP1 are used, while part of the nozzles which are not used to form the rectangular pattern FP1 are used. Therefore, the model pattern MP3 can be configured to have a width, in the auxiliary scanning direction, DW3 which is 3/2 of the width DW1 accurately without being affected by the conveying error of the sheet Q.

The fourth model pattern MP4 is a pattern modeling a third state around the intersection between the first pattern PE1 and the second pattern PE2 in the intersecting pattern CP. Around the intersection, a state where the block BE1 and the block BE2 start to overlap. The model pattern MP4 is configured to model a state where the block BE1 and the block BE2 does not overlap in the auxiliary scanning direction, but the block BE1 and the block BE2 arranged next to each other such that an lower side of the block BE1 and an upper side of the block BE2 contact. Similar to the model patterns MP2 and MP3, the model pattern MP4 is formed by reciprocally moving the recording head 40 in the main scanning direction with the sheet Q being unmoved. Similar to the model pattern MP3, the model pattern MP4 can be formed by changing the nozzle group used to from the rectangular pattern FP 1 and the nozzle group used to form the rectangular pattern FP 2. Accordingly, the model pattern MP4 is configured to have a width DW4 which is twice the width DW1 in the auxiliary scanning direction accurately without being affected by the conveying error of the sheet Q.

After execution of the first forming process (S120), the main controller 10 causes, through the print controller 30, the sheet conveyer 61 to rotate the conveying roller 613 by a particular amount L1 to convey the sheet Q toward the downstream side by the particular amount L1 (S130). The particular amount L1 corresponds the intervals of the first pattern PE1. As above, the process to convey the sheet Q by the particular amount L1 is realized by controlling the rotating amount of the conveying roller 613. Therefore, an actual sheet conveying amount by the process of S130 includes an error with respect to the particular amount L1.

After execution of S130, the main controller 10 determines whether the first pattern PE1 firstly formed on the sheet Q has reached the second recording area R2. When it is determined that the firstly formed first pattern PE1 has not reached the second recording area R2 (S140: NO), the main controller 10 moves to S120 and re-executes the first forming process in which the recording head 40 is caused to re-form the first pattern PE1 and the model patterns PM1-MP4 on the sheet Q.

FIGS. 7A-7D show first patterns PE1 and the model patterns MP1-MP4 which are formed on the sheet Q stepwise at the interval of L1 as S120 and S130 are repeatedly executed. The state of the sheet Q changed from a state indicated in FIG. 7A to a state indicated in FIG. 7B by execution of S130, determination in S140 and re-execution of S120. Similarly, through the processes of S130, S140 and S120, the state of the sheet Q is changed from a state indicated in FIG. 7B to a state indicated in FIG. 7C, and then, from a state indicated in FIG. 7C to a state indicated in FIG. 7D. It is noted that the "N1" indicated in each of FIGS. 7A-7D schematically indicates a position of the first nozzle group N1.

The particular amount L1 is integral division of the length L0 (See FIG. 2) in the auxiliary scanning direction between the first recording area R1 in which the first pattern PE is formed and the second recording area R2 in which the second pattern PE2 is formed in the recording area R0.

In the present embodiment, the error of the actual sheet conveying amount with respect to the rotation amount of the conveying roller 613 depends on the rotation phase φ of the conveying roller 613 when the sheet is being conveyed. According to the embodiment, in order to suppress the influence of the conveying error of the sheet Q depending on the rotation phase φ, one circuit of the conveying roller 613 is divided into a plurality of sections respectively corresponding to different rotation phases φ, and the conveying errors for the respective phases φ are determined. Formation of the first pattern PE1 which is executed at every particular amount L1 is for determining the conveying errors for respective rotation phases φ.

The main controller 10 makes negative determination in S140 until the first pattern PE1 firstly formed on the sheet Q reaches the second recording area R2 (S140: NO), and repeatedly execute the process of S120 and S130. When it is determined that the first pattern PE1 firstly formed has reached the second recording area R2 (S140: YES), the main controller 10 proceeds to S150 and executes the second forming process.

In the second forming process (S150), the main controller 10 causes the recording head 40 to form the first pattern PE1 and the model patterns MP1-MP4 on a portion corresponding to the first recording area R1 of the sheet Q with use of the first nozzle group N1, and the second pattern PE2 on a portion of the second recording area R2 of the sheet Q (S150).

That is, the main controller 10 causes the recording head 40 to form the first pattern PE1 and model patterns MP1-MP4 and the second pattern PE2 on the sheet Q with user of different nozzle groups N1 and N2 with the sheet Q being unmoved. With this configuration, the second pattern PE2 is formed so as to intersect with the first pattern PE which has moved to the second recording area R2 (see FIGS. 8A and 8B).

The second pattern PE2 formed on the sheet Q is, as shown in FIG. 5B, a stepwise pattern. Specifically, the second pattern PE2 is configured such that rectangular blocks BE2 each having a second length BL2 in the main scanning direction area arranged along a direction DR2 which is inclined at an acute angle θ2 with respect to the main scanning direction.

Every two blocks BE2 next to each other in the main scanning direction are, similar to the first pattern PE1, arranged to contact each other, and are arranged to be displaced, in the auxiliary scanning direction (i.e., Y-axis direction), by half a width BW2 of the side extending along the auxiliary scanning direction. The width BW2 of the block BE2 is same as the width BW1 of the block BE1, which is W0.

The second pattern PE2 is, as shown in FIG. 4, in the macroscopic view, a linear test pattern which is slightly inclined with respect to the main scanning direction. It should be noted, however, the acute angle θ2 is smaller than the acute angle θ1. That is, the second pattern PE2 is configured such that the blocks BE2, each of which has the second length BL2 which is larger than the first length BL1 of the block BE1 in the main scanning direction, are arranged along the second direction DR2 which is inclined within an angle range between the main scanning direction and the first direction DR1.

FIGS. 9A and 9B show enlarges views of the intersecting patterns CP formed on the sheet Q in the second forming process (S150), that is, the intersecting states of the first pattern PE1 and the second pattern PE2 are indicated. FIG. 9A shows the intersecting state of the first pattern PE1 and the second pattern PE2 when the sheet Q is conveyed, after the first pattern PE1 is formed, by the distance L0 accurately when there is no conveying error of the sheet Q. FIG. 9B shows the intersecting state of the first pattern PE1 and the second pattern PE2 when there exists the conveying error ΔY, and the sheet Q is conveyed by a distance L0+ΔY after the first pattern PE1 is formed on the sheet Q.

After execution of the second forming process, similar to the process in S130, the main controller 10 causes, through the print controller 30, the sheet conveyer 61 to convey the sheet Q toward the downstream side, in the sheet conveying direction, by the particular amount L1 (S160). Thereafter, the main controller 10 determines, in S170, whether a particular number of the first patterns PE1 have been formed. When it is determined that the particular number of the first patterns PE1 have not yet been formed (S170: NO), the main controller 10 moves to S150.

As above, the main controller 10 makes negative determination in S170 until the particular number of the first patterns PE1 have been formed, and executes the second forming process (S150). As described above, the main controller 10 causes the recording head 40 to form the first pattern PE1 and the second pattern PE2, and further the model patterns MP1-MP4 on the sheet Q (S150), and causes the sheet conveyer 61 to convey the sheet Q by the particular amount L1. The above process is repeatedly executed (S160).

Figure 8A:
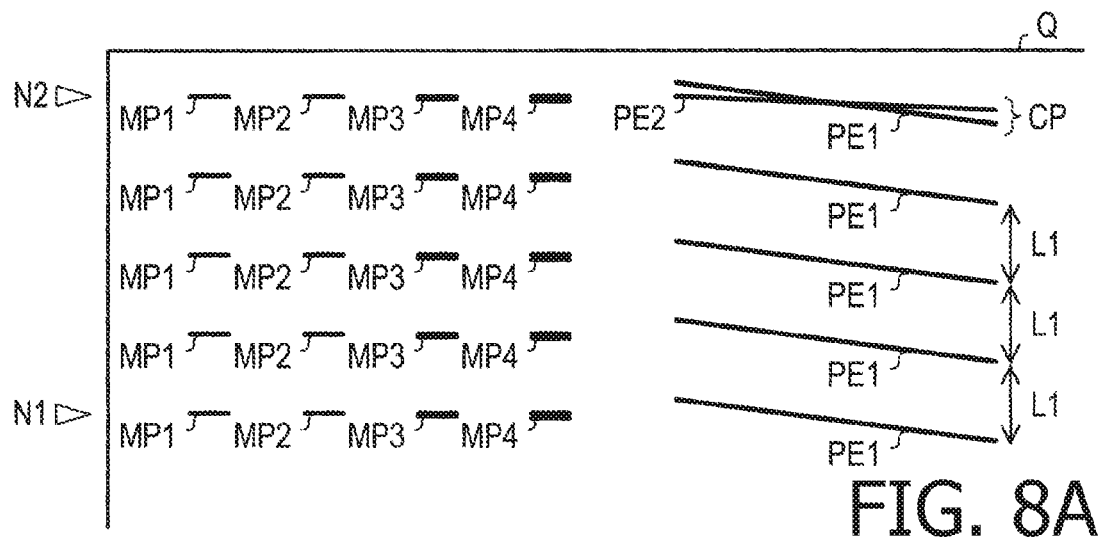
Figure 8B:
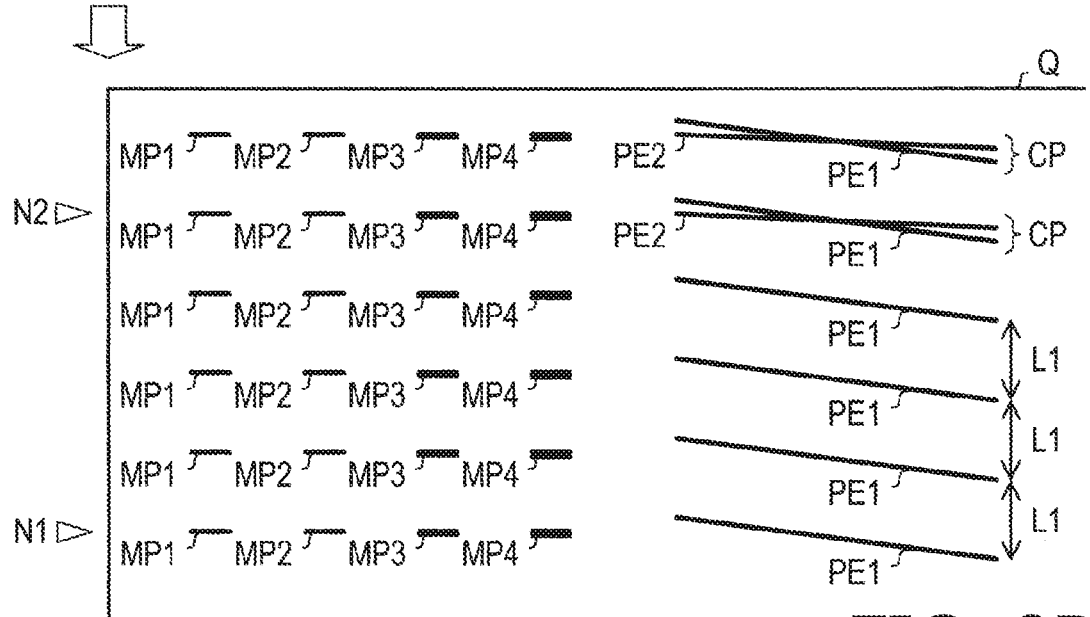

In FIGS. 8A and 8B, the first pattern PE1, the second pattern PE2 and the model patterns MP1-MP4 which are formed stepwise at an interval of L1 on the sheet as S150 and S160 are repeated. The state of the sheet Q changes from the state shown in FIG. 7D to the state shown in FIG. 8B as S130 is executed, determination is made in S140, and S150 is executed. Further, after execution of S160, negative decision in D170, and execution of S150, the state is changed to the state shown in FIG. 8B. It is noted that "N1" and "N2" shown in FIGS. 8A and 8B schematically indicate positions of the first nozzle group N1 and the second nozzle group N2, respectively.

When the particular number of first patterns PE1 have been formed, the main controller 10 proceeds to S180. In S180, the main controller 10 executes a third forming process. In the third forming process, the main controller 10 causes, through the print controller 30, the recording head 40 to form the second pattern PE2 at a portion of the sheet Q located at the second recording area R with use of the second nozzle group N2 (S180). That is, the main controller 10 causes the recording head 40 to form the second pattern PE2 so as to intersect with the first pattern PE which has reached the second recording area R2. At this stage, the first pattern PE1 or the model patterns MP1-MP4 are not formed on the sheet Q. Only the second pattern PE2 is formed on the sheet Q.

Thereafter, the main controller 10 determines whether the second patterns PE2 for all the first patterns PE1 have been formed (S190). When the second patterns PE2 for all the first patterns PE1 have not been formed (S190: NO), the main controller 10 proceeds to S200. In S200, the main controller 10 causes the sheet conveyer 61 to convey the sheet Q by the particular amount L1, as in S130, then proceeds to S180.

As above, the main controller 10 repeatedly executes a process of causing the sheet conveyer 61 to convey the sheet Q by the particular amount (S200) and causes the recording head 40 to form the second pattern PE2 on the sheet Q (S180) until the second patterns PE2 for all the first patterns PE1 have not been completed. When the second patterns PE2 for all the first patterns PE1 have been formed (S190: YES), the main controller 10 terminates the discharging process (S210).

In S210, the main controller 10 causes, through the print controller 30, the sheet conveyer 61 to discharge the sheet Q onto the discharge tray. Further, the main controller 10 displays a message encouraging the user to place the sheet Q on which the test pattern is formed on the original table of the scanner 70 and input a scanning instruction on the display of the user I/F 90 (S220). Thereafter, the main controller waits for the scanning instruction is input through the user I/F 90 (S230).

Upon inputting of the scanning instruction, the main controller 10 controls the scanner 70 to read the sheet Q on which the test pattern is printed, and obtains the image data representing the read image from the scanner 70 (S240). In the following description, image data representing a read image of the sheet Q on which the test pattern has been printed will merely be referred to as the "read image data."

Further, the main controller 10 detects an intersection position Xc at which the first pattern PE1 and the second pattern PE2 intersect each other (S250) for each intersecting pattern CP based on the read image data obtained from the scanner 70, and calculates the error ΔX of the detected intersection position Xc with respect to the standard position Xs (S260). Further, the main controller 10 calculates the conveying error ΔY of the sheet Q based on the error ΔX for each intersecting pattern CP (S260). The standard position Xs corresponds to the intersecting position when there exists no conveying error of the sheet Q, which is exemplary indicated in FIG. 9A. The intersection position Xc when there exists the conveying error ΔY of the sheet Q and the error ΔX of the intersection position Xc are exemplarily indicated in FIG. 9B.

When the first pattern PE1 is approximated by the line extending along the direction DR1 and the second pattern PE2 is approximated by the line extending along the direction DR2, according to a specified geometric relationship based on the fact that the inclination of the line is fixed, the conveying error ΔY of the sheet corresponding to the error ΔX of the intersection position Xc can be calculated. For example, the conveying error ΔY can be calculated based on a relational expression:

$$\Delta Y = \Delta X(\tan \theta 2 - \tan \theta 1).$$

Thereafter, the main controller 10 updates the control parameter representing the correspondence between the rotation amount and the rotation phase of the conveying roller 613 and the sheet conveying amount stored in the NVRAM 17 based on the conveying error ΔY for each intersecting pattern CP calculated in S260 (S270), and terminates the test printing process shown in FIG. 3.

In the conventional technique, since the first pattern does not have an inclination and is parallel to the main scanning direction, an angle at which the first pattern and the second pattern intersect cannot be made sufficiently small due to influence of a dot pitch in the auxiliary scanning direction. Therefore, when the conveying error of the sheet Q is not so large, displacement of the intersecting point is small, and it is difficult to accurately calculate the conveying error based on the displacement of the intersecting point. Further, even if the intersecting angle is made smaller, since the second pattern has the stepwise form but not a line, the intersecting point does not displaced from the standard position unless the conveying error of the sheet Q is generated by one pixel amount or more in the auxiliary scanning direction. Therefore, according to the conventional technique, the conveying error less than the dot pitch (i.e., a nozzle interval) cannot be detected.

According to the present embodiment, since the first pattern PE1 and the second pattern PE2 are both inclined, an angle at which the first pattern PE1 and the second pattern PE2 intersect can be made small without being affected by the dot pitch in the auxiliary scanning direction so much. Therefore, as is understood from FIGS. 9A and 9B, the error ΔX of the intersection position Xc with respect to the standard position Xs corresponding to the conveying error ΔY of the sheet Q can be made relatively large in comparison with the conventional art. Therefore, according to the embodiment, the conveying error ΔY of the sheet Q can be calculated based on the error ΔX of the intersecting point accurately.

According to the conventional art, when the conveying error less than the dot pitch in the auxiliary scanning direction is to be detected, it is necessary to convey the sheet Q minutely. In contrast, according to the embodiment, the conveying error less than the dot pitch can be detected without the minute conveyance of the sheet Q as is done in the conventional art. Therefore, according to the present embodiment, by forming the test pattern quickly or efficiently, the conveying error ΔY of the sheet Q can be calculated accurately.

Further, accuracy of the calculation of the conveying error ΔY can be improved by detecting the intersection position Xc accurately with use of a technique described below. Hereinafter, an image analyzing process employing the technique of accurately detecting the intersection position Xc will be described with reference to FIG. 10. It is noted that the image analyzing process shown in FIG. 10 is called in S250 of FIG. 3.

Figure 10:
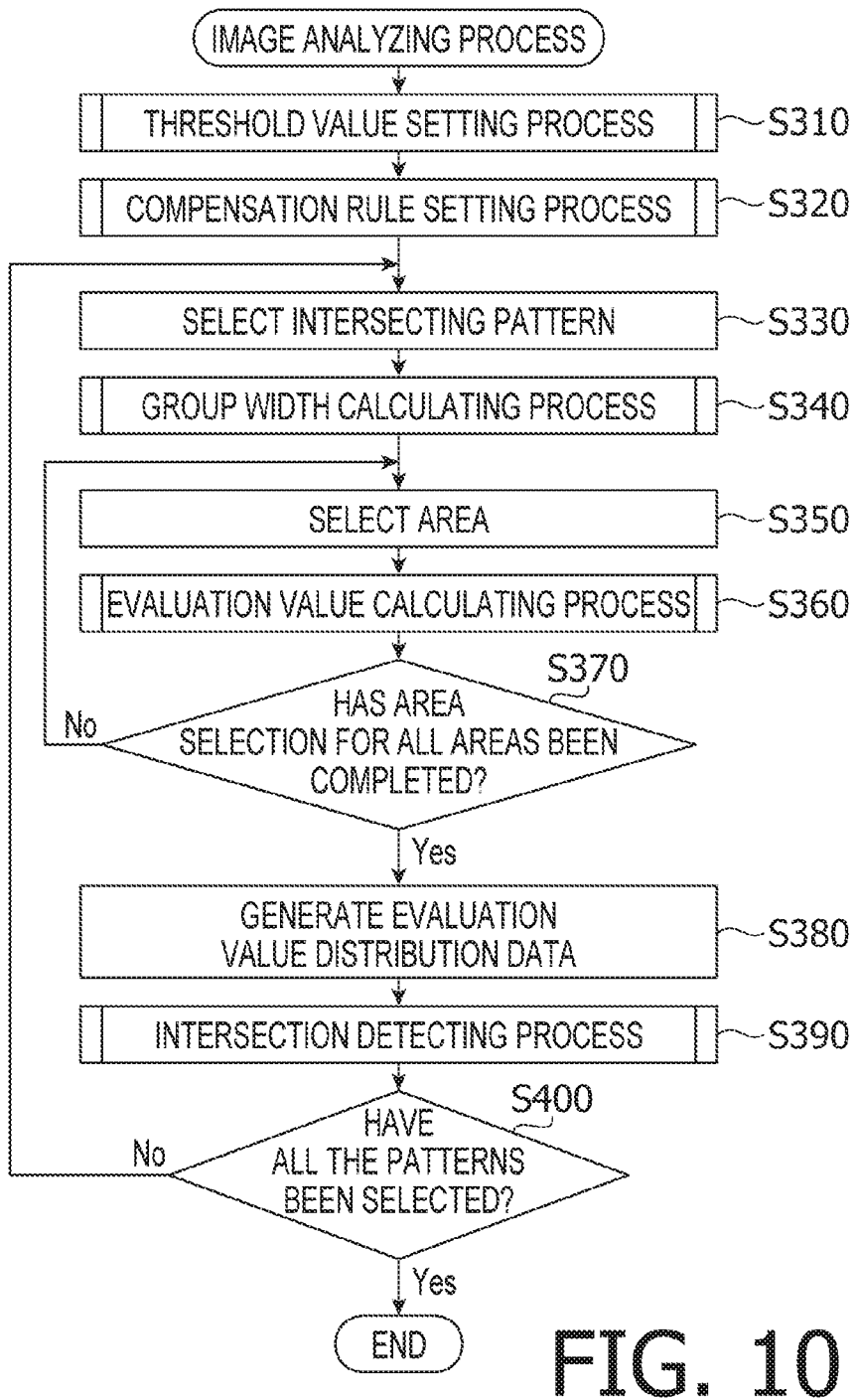
FIG. 10 is a flowchart illustrating an image analyzing process executed by the main controller.

When the image analyzing process shown in FIG. 10 is started, the main controller 10 sets a threshold value TH (S310), which is used to distinguish the recording area and non-recording area of the test pattern in the read image data based on the motel pattern MP1 transcribed in the read image data obtained in S240. According to the embodiment, the area exhibiting the brightness value smaller than a brightness threshold value TH is identified as the recording area of the test pattern, and an area exhibiting the brightness value exceeding the brightness threshold value TH is identified as non-recording area of the test pattern. By setting the brightness threshold value TH based on the model pattern MP1 of which width in the auxiliary scanning direction and included in the read image data is known, the recording area and the non-recording area of the test pattern can be identified accurately with suppressing influence of change of brightness due to material of the sheet Q and/or material of the ink. This contributes accurate detection of the intersecting point Xc. The area of the model pattern MP1 in the read image data can be identified with use of known image analyzing technique based on the brightness distribution indicated by the read image data and brightness distribution assumed in accordance with arrangement of a design test pattern.

Figure 11:
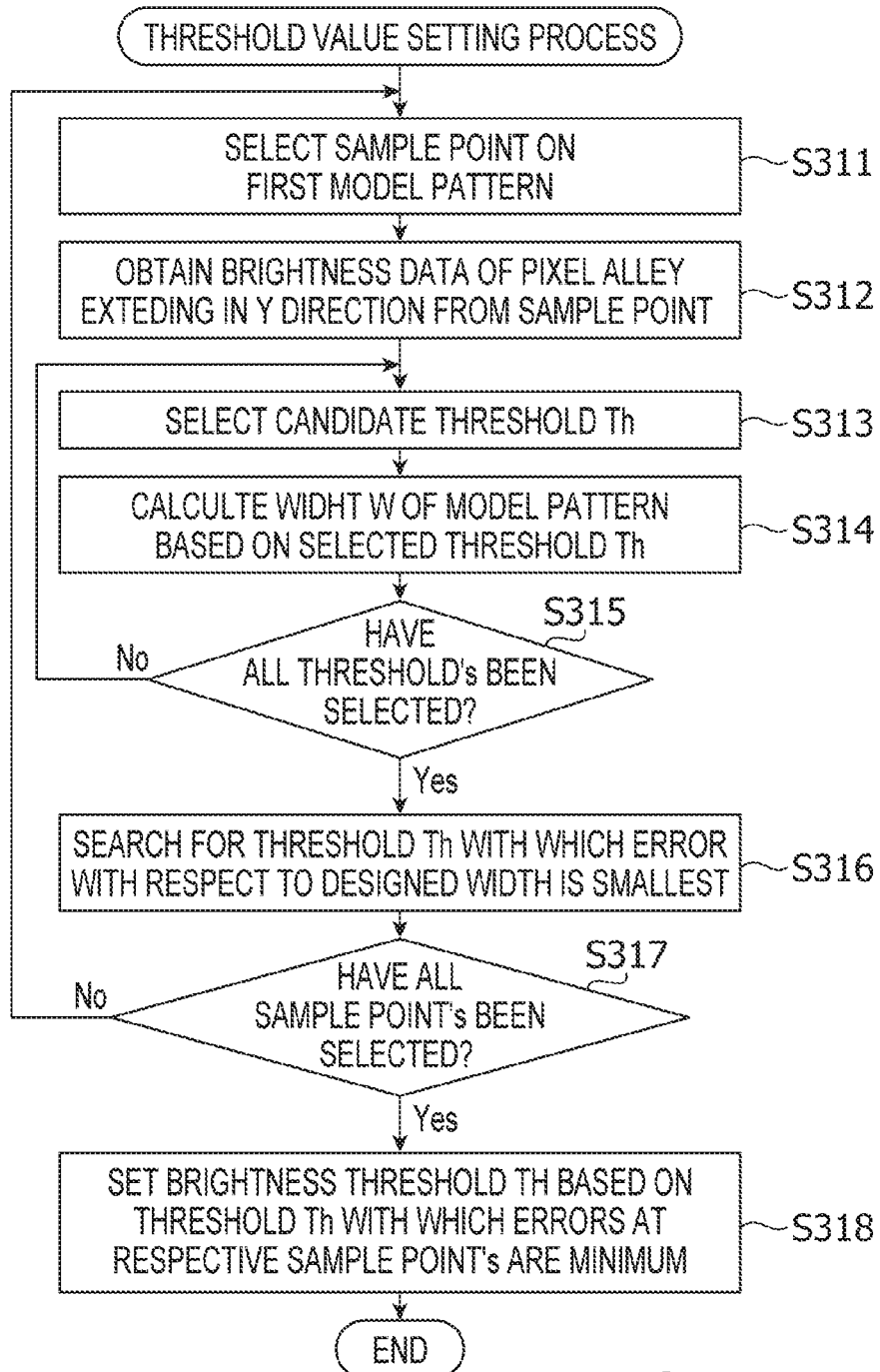
FIG. 11 is a flowchart illustrating a threshold value setting process executed by the main controller.

Concretely, in S310, the threshold value setting process shown in FIG. 11 is executed, and the above-described brightness threshold value is set. When the threshold value setting process is started, the main controller 10 selects one of sample points of the model pattern MP1 included in the read image data. The sampling point selected here is a pixel, in the area in which the model pattern MP1 is transcribed, in the image data. It is noted that one of a plurality of sample points are defined for each of the plurality of model patterns MP1 transcribed in the read image data (S311).

After the sample point is selected, the main controller 10 obtains the brightness data of a pixel array extending in the Y-axis direction from the selected sample point (S312). It is noted that the Y-axis and the X-axis directions for the read image data respectively correspond to the auxiliary scanning direction and the main scanning direction when the test pattern is formed. Further, the XY orthogonal coordinates system is defined for the read image data. The Y-axis corresponds to the auxiliary scanning direction when the test pattern is formed (i.e., the sheet conveying direction). The X-axis corresponds to the main scanning direction when the test pattern is formed (i.e., the direction orthogonal to the sheet conveying direction). In the XY orthogonal coordinate system in the read image data, coordinates are defined in a pixel unit of the read image data.

Figure 12:
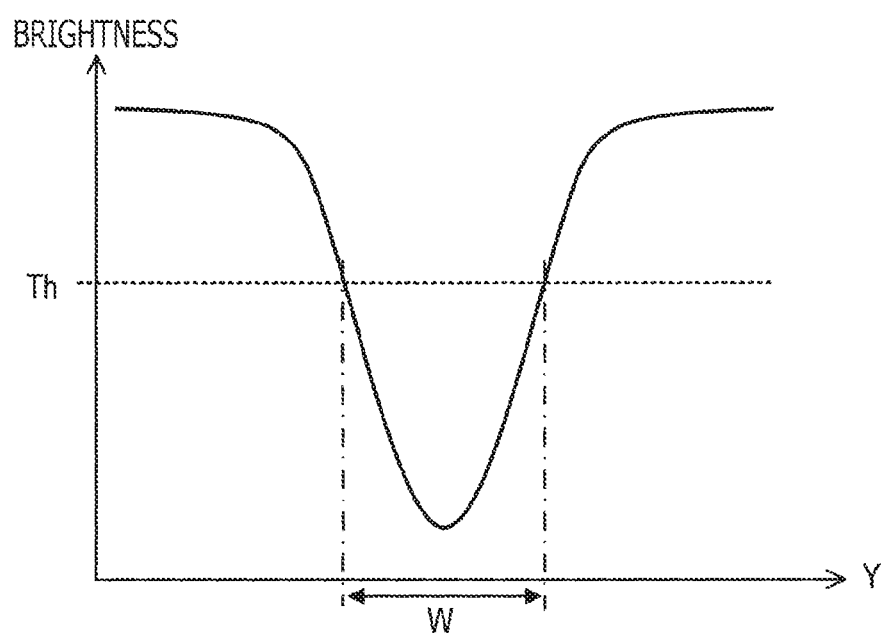
FIG. 12 is a graph schematically shows brightness distribution in an auxiliary scanning direction (Y-axis direction).

That is, in S312, the main controller 10 obtains the brightness data representing the brightness of each pixel which belong to a pixel array having the same X coordinate as the sample point and distributes within a particular range in the Y-axis direction with respect to the sample point. FIG. 12 is a graph showing a schematic distribution of the brightness represented by the brightness data. In the graph shown in FIG. 12, the horizontal axis indicates the Y coordinates, while the vertical axis indicates the brightness values. As is understood from FIG. 12, the brightness data exhibits high brightness corresponding to a white color at Y coordinates corresponding to the non-recording area of the model pattern MP1, exhibits low brightness corresponding to a black color at Y coordinates corresponding to the recording area of the model pattern MP1, and exhibits intermediate brightness between the high brightness and the low brightness at a boundary between the non-recording area and the recording area of the model pattern MP1.

After obtaining the brightness data, the main controller 10 calculates, based on the brightness data, a width in the Y-axis direction (i.e., the auxiliary scanning direction) of the model pattern MP1 based on the threshold value Th, for all the threshold values Th corresponding to candidates of the brightness threshold values TH, and searches for the threshold value Th having least error with respect to the designed value DW1 of the width of the model pattern MP1 (S313-S316).

Specifically, the main controller 10 selects one of the threshold values Th corresponding to the candidates of the brightness threshold value TH (S313), and calculates the width W in the Y-axis direction of the model pattern MP1 based on the selected threshold value Th (S314). Concretely, the main controller 10 calculates a distance from a starting point to an ending portion of the group of pixels of which brightness is smaller than the threshold value Th as the width W in the Y-axis of the model pattern MP1 (S314). In the following description, the width in the Y-axis direction will simply be referred to as a width.

The main controller 10 makes a negative determination in S315 until S313 and S314 are executed for all the threshold values Th corresponding to the candidates of the brightness threshold value TH, and executes the process of S313 and S314 with changing the threshold values. When the process in S313 and S314 has been executed for all the threshold values Th corresponding to the candidate of the brightness threshold value TH (S315: YES), the main controller proceeds to S316.

In S316, the main controller 10 searches for the width W having the least error with respect to the designed value DW1 from among a group of widths W calculated for respective threshold values Th's, and identifies the threshold value Th corresponding to the width W having the least error. As above, the main controller 10 searches for the threshold value Th having the lest error with respect to the designed value DW1 of the model pattern MP1.

After the threshold value Th corresponding to the width W having the least error is identified (S316), the main controller proceeds to S17 and determines whether the process in S311-S316 has been executed for all the sample points. When it is determined that the process in S311-S316 has not been executed for all the sample points (S317: NO), the main controller 10 returns to S311, selects one of the unprocessed sample points (S311), and executes the step S312 onwards. That is, the main controller searches for the threshold value Th having the least error with respect to the designed value DW1 in regard with the width W of the model pattern MP1 at the sample portion as selected and identifies the same. In the following description, the threshold value Th which is identified to have the least error will be referred to as the identified threshold Th.

After execution of the above process for all the sample points (S317: YES), the main controller 10 determines the brightness threshold value TH based on the identified threshold values Th of respective sample positions (S318). The brightness threshold value TH is set to a statistical representative value of the identified threshold values Th of all the sample points. According to the embodiment, the brightness threshold value TH is set to an averaged value of the identified threshold values Th for all the sample points. According to another embodiment, the brightness threshold value TH is set to a central value of the identified threshold values Th of all the sample points. Alternatively, the brightness threshold value TH may be determined based on the identified threshold values Th of part of the sample points.

In an exemplary embodiment, the brightness threshold value TH may be determined by excluding the identified threshold values Th of a particular number of or particular rate of sample points having higher identified threshold values Th, excluding the identified threshold values Th of a particular number of or particular rate of sample points having lower identified threshold values Th, and averaging the identified threshold values Th of the remaining sample points.

Figure 13:
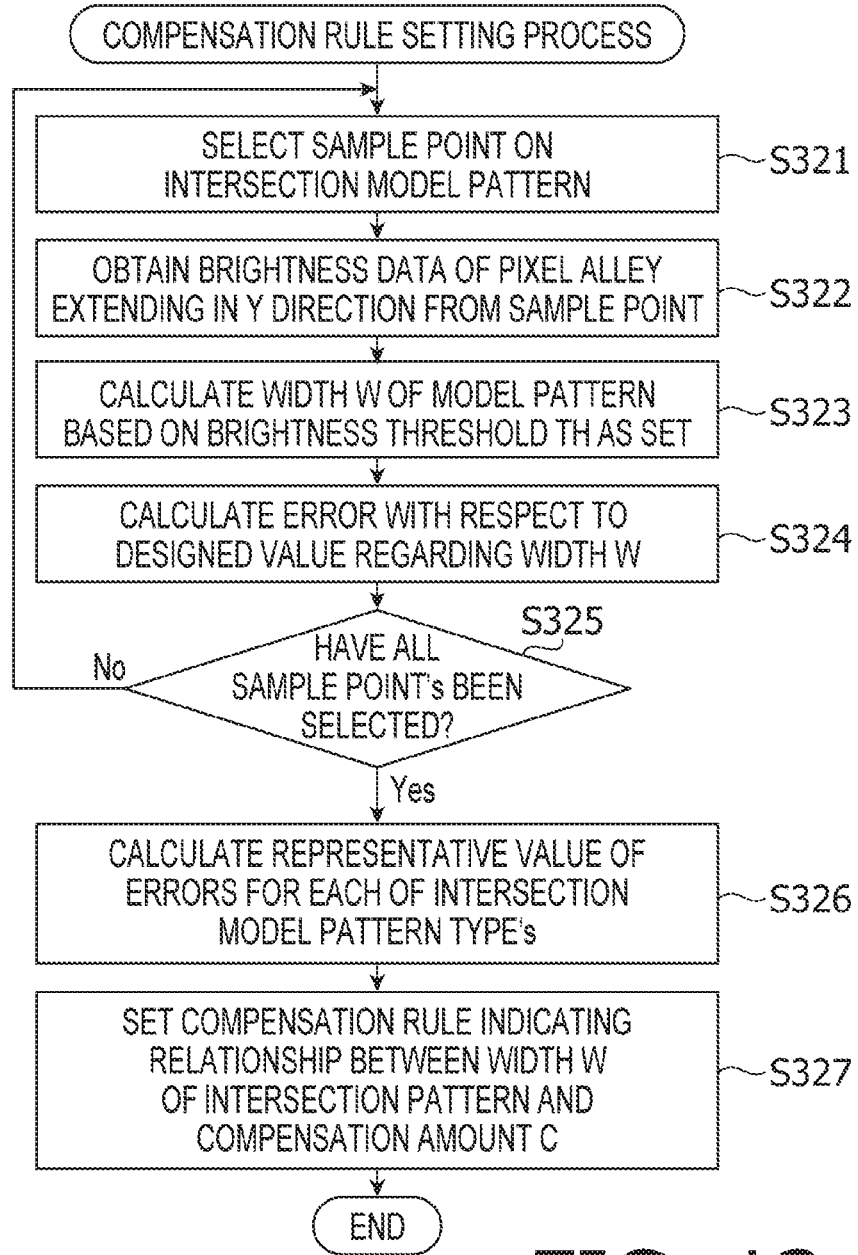
FIG. 13 is a flowchart illustrating a compensation rule setting process executed by the main controller.

After the brightness threshold value TH is set as described above, the main controller 10 terminates the threshold value setting process and proceeds to S320 (FIG. 10). In S320, the main controller 10 executes a compensation rule setting process shown in FIG. 13. In the compensation rule setting process, a compensation rule for the width W which is calculated based on the brightness threshold value H is set in order to suppress a calculation error of the width W which may occur even if the brightness threshold value TH is set in S310. According to the present embodiment, the intersection position Xc of the intersecting pattern CP is detected based on the distribution of the widths W of the intersecting pattern CP. The width W seems to be calculated accurately with use of the brightness threshold value TH set in S310.

However, the intersecting pattern CP includes a portion where the block BE1 and the block BE2 overlap, and a portion where the block BE1 and the block BE2 do not overlap. On the sheet Q, at the portion where the block BE1 overlaps the block BE2, the amount of the ink adhered on the portion is large. Therefore, brightness of such a portion becomes low in comparison with the portion where the block BE1 does not overlap the block BE2.

In particular, at a portion where the block BE1 and the block BE2 completely overlap as the second pattern MP2 shown in FIG. 6, brightness gradient at a boundary between the recording area and the non-recording area is steep in comparison with the brightness gradient at an area where the block BE1 and the block BE2 does not overlap as modeled into the model pattern MP1.

Therefore, when the main controller 10 attempts to calculate the width W of each points by applying the brightness threshold value TH which is set based on the model pattern MP1 not including the overlapped portion with respect to the intersecting pattern CP including the overlapped portion, there is a possibility that the width W cannot be calculated accurately. Because of this reason, the compensation rule is set in S320.

When the compensation rule setting process is started, the main controller 10 selects one of the sample points of the intersecting model pattern transcribed in the read image data (S321). The sample point selected in S321 is one pixel of an area where the intersecting model pattern is transcribed in the read image data. The intersecting model pattern here indicates the second model pattern MP2, the third model pattern MP3 and the fourth model pattern MP4. It is noted that one or a plurality of sample points are defined for each of the plurality of intersecting model patterns transcribed in the read image data.

After selection of the sample point, the main controller 10 obtains, as in the process in S312, the brightness data of the pixel array extending in the Y-axis direction from the selected sample point (S322). That is, in S322, the main controller 10 obtains the brightness data representing brightness of each of the pixels belonging to the particular range, along the Y-axis direction, with respect to the sample point.

After obtaining the brightness data, the main controller 10 calculates the width W, in the Y-axis direction, of the intersecting model pattern corresponding to the sample point from the brightness data by discriminating the boundary between the recording area and the non-recording area based on the brightness threshold value TH set in S310 (S323). Concretely, the main controller 10 calculates a distance from the starting point to the ending point of the group of pixels which are arranged in the Y-axis direction and exhibit the brightness values equal to or less than the brightness threshold value TH continuously as the width W, in the Y-axis direction, of the intersecting model pattern corresponding to the sample point (S323).

Thereafter, the main controller 10 calculates an error of the width W calculated in S323 with respect to the designed value of the width of the intersecting model pattern (S325). When the intersecting model pattern corresponding to the sample point is the second model pattern MP2, the designed value of the width is DW1 which is the same as the width of the model pattern MP1. When the corresponding intersecting model pattern is the third model pattern MP3, the designed value of the width is, as shown in FIG. 6, indicated as follows: $DW3=(3/2) \times DW1$. When the corresponding intersecting model pattern is the fourth model pattern MP4, the designed value of the width is, as shown in FIG. 6, indicated as follows:

$$DW4 = 2 \times DW1.$$

After calculating the error in S324, the main controller 10 determines whether the process of S321-S324 has been executed for all the sample points of the intersecting model pattern (S325). When it is determined that the process of S321-S324 has not been executed for part of the sample points (S325: NO), the main controller 10 proceeds to S321, selects an unprocessed sample point (S321) and executes the process of S322 onwards. That is, with respect to the selected sample point, the main controller 10 calculates the error from the designed value regarding the width W of the intersecting model pattern.

After executing the above process for all the sample points (S325: YES), the main controller 10 calculates the representative value of the errors by applying a statistic process to the errors calculated from the plurality of sample points regarding the intersecting model pattern, for each of the intersecting model pattern types (S326). The representative value may be an average value or a central value of the errors calculated from the plurality of sample points. It is noted, however, when the representative value is calculated, the errors for all the sample points are not necessarily used.

For example, when, for the plurality of sample points of the model pattern MP2, errors between the calculated values from the brightness data and the designed values are calculated (S324) and an average value of the errors is calculated (S326), the main controller 10 may exclude, from the plurality of sample points, a particular rate of sample points from the sample points exhibiting larger errors, and calculate the average value of the errors for the reaming sample points. In S326, a representative value E1 of the errors regarding the model pattern MP2, a representative value E3 of the errors regarding the model pattern MP3, and a representative value E4 of the errors regarding the model pattern MP4 can be calculated.

Thereafter, the main controller 10 sets the compensation rule representing a relationship between the width W of the intersecting pattern PC calculated based on the brightness threshold value TH and a compensation amount C based on the representative values E1, E3 and E4 of the respective model patterns MP2, MP3 and MP4 (S327).

At a position where the intersecting pattern has the width DW1 (i.e., at a position where the block BE1 completely overlap the block BE2), the width W calculated based on the read image data is considered to include an error corresponding the representative value E1 of the model pattern MP2. That is, when the width calculated based on the read image data is DW1+E1, the correct value of the width is assumed to be DW1.

Similarly, at a position where the intersecting patter CP has the width DW3, the width W calculated based on the read image data is assumed to include an error corresponding to the representative value E3 of the model pattern MP3. That is, when the width calculated based on the read image data is DW3+E3, the correct value of the width is assumed to be DW3. Similarly, at a position where the intersecting pattern CP has the width DW3, the width W calculated based on the read image data is considered to include an error corresponding to the representative value E4 of the model pattern MP4. That is, when the width calculated based on the read image data is DW4+E4, the correct value of the width is assumed to be DW4.

Therefore, in S327, as the compensation rule, the compensation amount C with respect to the width W calculated based on the read image data can be defined as indicated below.

(I) when the width W is equal to or less than (DW1+E1), the compensation amount C=−E1

(II) when the width W is equal to (DW3+E3), the compensation amount C=−E3

(III) when the width W is equal to or larger than (DW4+E4), the compensation amount C=−E4

Further, the compensation amount C when (DW1+E1)<W<(DW3+E3), the compensation amount C when (DW3+E3)<W<(DW4+E4) can be determined through linear interpolation as indicated below.

(IV) when (DW1+E1)<W<(DW3+E3), C=α1·w+β1,
where, α1=(E1−E3)/[(DW3+E3)−(DW1+E1)], and
β1=−α1·(DW3+E3)−E3

(V) when (DW3+E3)<W<(DW5+E5), C=α2·w+β2,
where, α2=(E3−E4)/[(DW4+E4)−(DW3+E3)], and
β2=−α2·(DW4+E4)−E4

Figure 14:
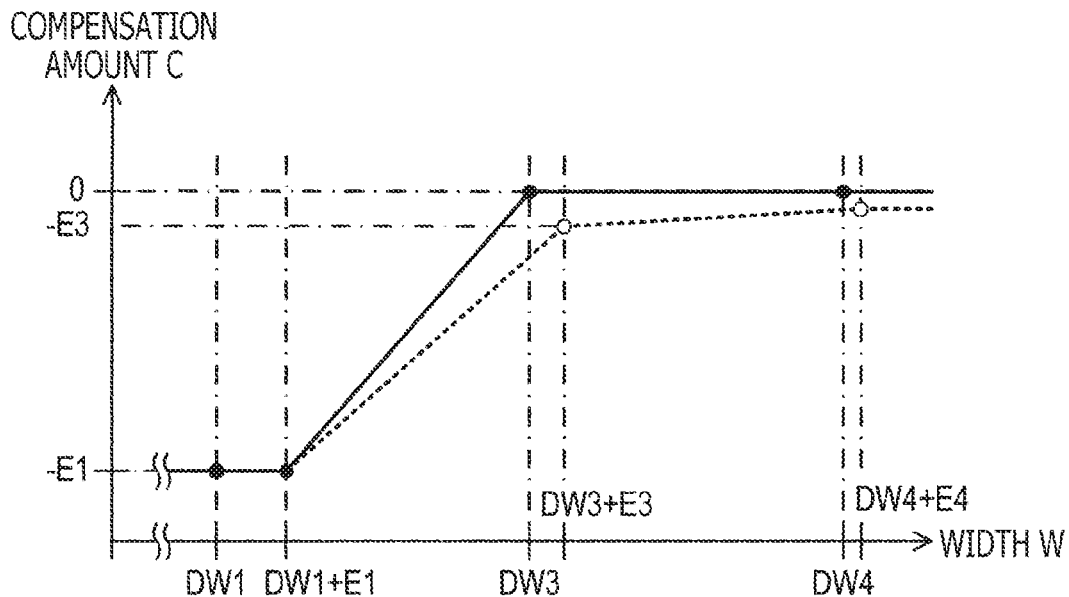
FIG. 14 is a graph showing a relationship between a width and a compensation amount.

The relationship between the width W and the compensation value C according to the above compensation rule is indicated by broken lines in FIG. 14. It is noted, however, the errors of the widths of the model patterns MP3 and MP4 (representative values E3 and E4) with respect to the designed values are substantially zero as far as the brightness threshold value TH is appropriate. It is because the end sides (an upper side and a lower side) defining the model patterns MP3 and MP4 are not overlapped portions, and have the same brightness as the model pattern MP1.

Therefore, when the compensation rule is set, it is regarded that E3=E4=0. That is, in S327, the compensation amount C with respect to the width W calculated from the read image data may be defined as follows, as the compensation rule.

(I) when the width W is equal to or less than (DW1+E1), the compensation amount C=−E1

(II) when (DW1+E1)<W<DW3, the compensation amount C=α3·W+β3
where, α3=E1/[DW3−(DW1+E1)], and β3=−α3·DW3

(III) when the width W is equal to or larger than DW3, the compensation amount C=0

The relationship between the width W and the compensation amount C according to the above compensation rule is indicated by solid lines in FIG. 14. In order to set the compensation rule, neither the model pattern MP3 nor MP4 is necessary. Therefore, the model pattern MP3 or MP4 need not be formed on the sheet Q. In another example, only E4 is regarded as zero, and a measured value is used as E3 to set the compensation rule. When the compensation rule is set as above, the main controller 10 terminates the compensation rule setting process shown in FIG. 13, and proceeds to S330 (see FIG. 10).

In S330, the main controller 10 selects one of the intersecting patterns CP subject to detection of the intersection from among a group of the intersecting patterns CP transcribed in the read image data. Thereafter, regarding the intersecting patterns CP subject to the intersection detection, the main controller executes a group width calculating process shown in FIG. 15 (S340). In the group width calculating process, a process necessary to shape the intersecting pattern CP is executed.

Each of the intersecting patterns CP according to the present embodiment is formed such that the first pattern PE1, in which the plurality of blocks BE1 having the same shape are arranged stepwise, and the second pattern PE2, in which the plurality of blocks BE2 having the same shape are arranged stepwise, intersect each other. Therefore, as shown in FIG. 16, the widths W of the intersecting pattern CP in the Y-axis direction at different X coordinates have only a limited number of kinds lengths at locations around the intersection position Xc, and there are a lot of pixel groups having the same widths W.

According to the present embodiment, a relative position between the first pattern PE1 and the second pattern PE2 changes basically only in the Y-axis direction (i.e., the auxiliary scanning direction) due to control error, and further the entire second pattern PE2 moves, in the Y-axis direction, relative to the first pattern PE1.

Therefore, the pixel groups of the same width W in design geometrically fixedly exist even if the relative position between the first pattern PE1 and the second pattern PE2 changes in the Y-axis direction due to the control error. According to the example shown in FIG. 16, a group A, a group B, a group C a group D and a group E are shown as the pixel groups each corresponding to the same width W in design.

Figure 16:
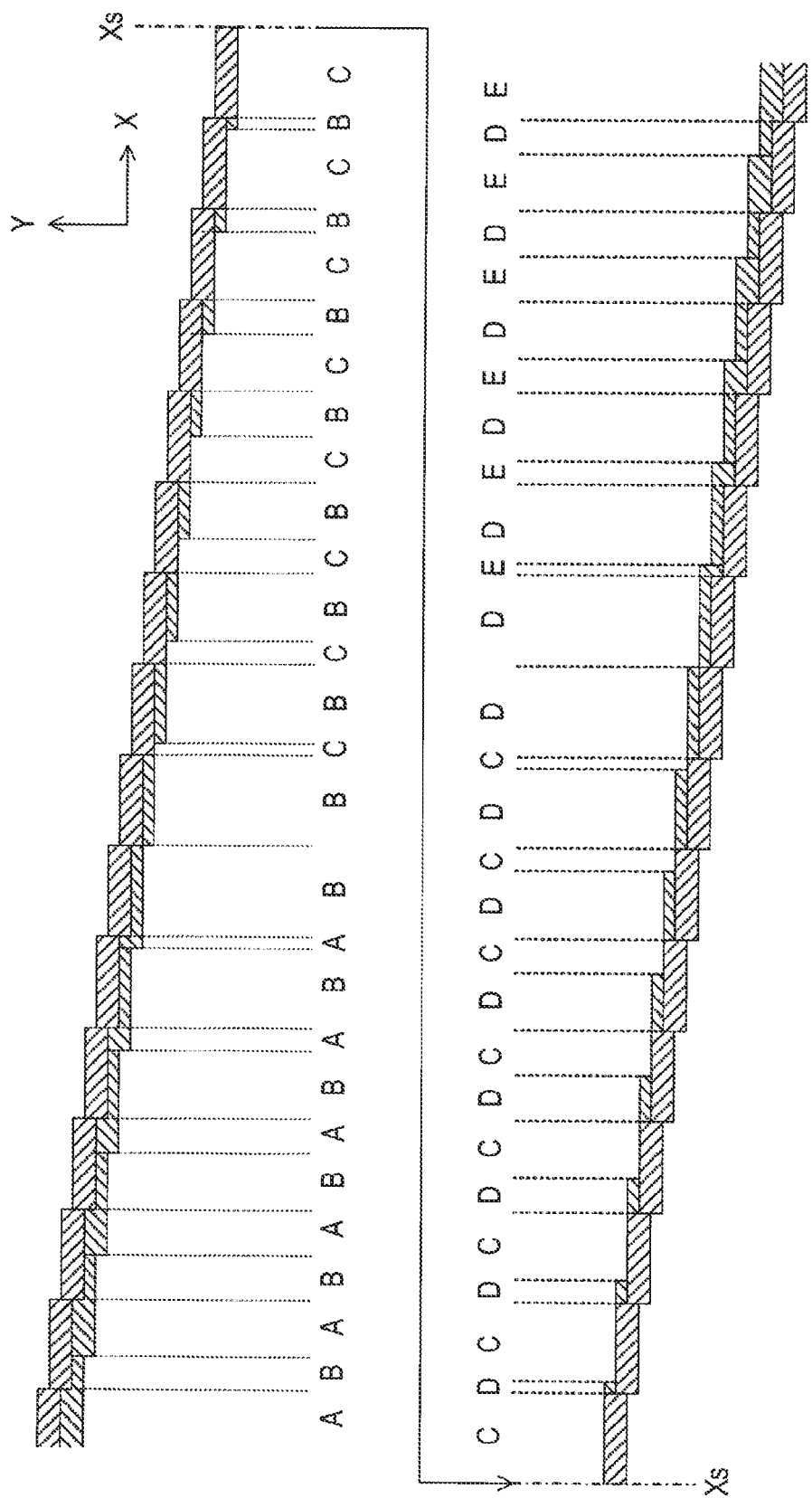
FIG. 16 shows groups which are designed to have the same widths.

In FIG. 16, the arrangement of the first pattern PE1 and the second pattern PE2 of the intersection pattern CP in which the intersecting point Xc is located at the standard position Xs is shown. An upper part and a lower part of FIG. 16 are actually connected in the X-axis direction at a position Xs. According to FIG. 16, it is understood that the lengths categorized in each of the group A, the group B, the group C, the group D and the group E have the same width W in the Y-axis positive direction. Each of the group A, the group B and the group C is a group in which, when the second pattern PE2 is formed at a position shifted in the Y-axis direction with respect to the first pattern PE1, the width W increases by the amount same as the shifted amount. Each of the group D and the group E is a group in which, when the second pattern PE2 is formed at a position shifted, with respect the first pattern PE1 in the Y-axis positive direction, the width W decrease by the amount same as the shifted amount.

According to the present embodiment, based on the geometric characteristics of the intersecting pattern CP as above, for each of the pixel groups having the same width W in design, the main controller 10 shapes the intersecting pattern CP by calculating the representative value of the width W in the Y-axis direction of the pixels at each of the X coordinates belonging to the pixel group, and replacing the width W of the corresponding part of the intersecting pattern CP with the calculated width W.

Figure 15:
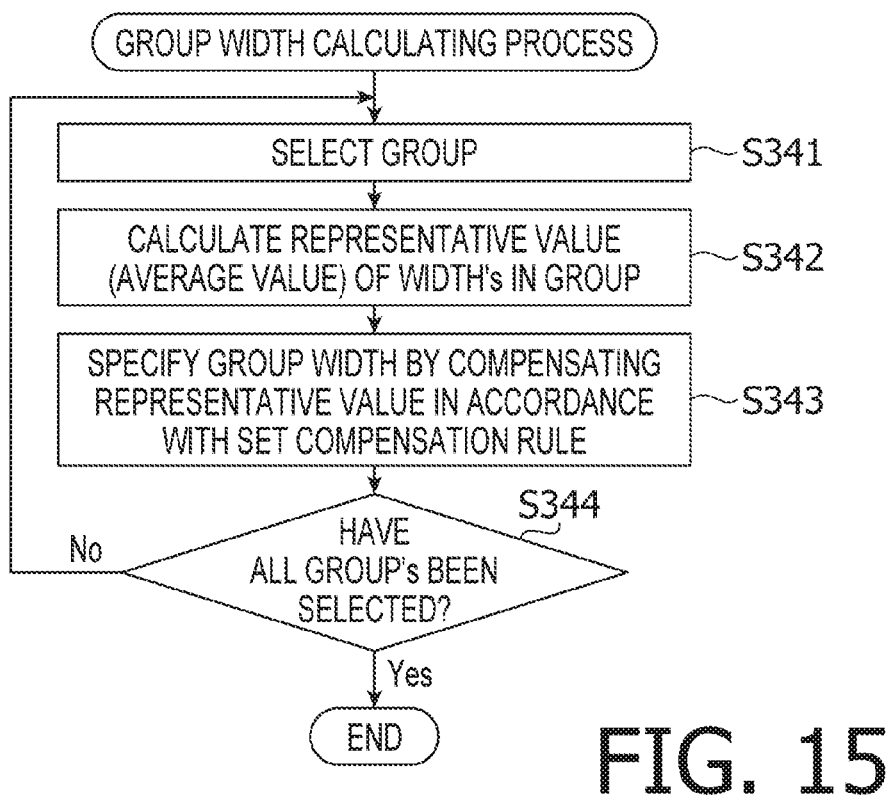
FIG. 15 is a flowchart illustrating a group width calculating process executed by the main controller.

When the group width calculating process shown in FIG. 15 is started, the main controller 10 selects one of the pixel groups respectively representing the same widths in design (S341). Thereafter, the main controller 10 calculates the representative value of the width W in the pixel group selected in S341 (S342). Concretely, the main controller 10 obtains, for respective X coordinates belonging to the pixel group, the brightness data indicating the brightness of each pixel belonging to the pixel array of which X coordinates are the same and within a particular range in the Y-axis direction. Then, for each X coordinate belonging to the pixel group, based on the obtained brightness data, a distance from a start point to an end point of the pixel group, of which brightness is equal to or less than the brightness threshold value TH in the Y-axis direction is calculated. In S342, the main controller 10 calculates the average value or the central value of the calculated widths W, as the representative value of the widths W in the Y-axis direction of the selected pixel group.

After calculating the representative value of the selected pixel group in S342, the main controller 10 proceeds to S342, and compensates the representative value calculated in S342 in accordance with the compensation rule set in S320. Then, the main controller specifies the compensated representative value as the width W of the corresponding pixel group (S343). In the following description, the width of the pixel group specified in S343 will also be referred to as a group width.

The main controller 10 makes negative decision in S344 until the process of S342 and S343 is executed for all the pixel groups such that the main controller 10 repeatedly executes the process of S341-S343 with switching the selected pixel group. When the process of S342 and S343 are executed for all the pixel groups, the main controller 10 makes affirmative decision in S344, and terminates the group width calculating process. As above, the main controller 10 calculates the representative value of the widths W and compensates the calculated representative value for each pixel group to specify the group width.

After executing the group width calculating process in S340, the main controller 10 selects one evaluation target area in the intersecting pattern CP (S350), and calculates an evaluation value Z of the width W in the selected evaluation target area (S360). The main controller 10 obtains the evaluation value Z of the width W of the intersecting pattern CP around the intersection position Xc for each of a plurality of positions (a plurality of areas) along the X-axis by repeatedly executing the process of S350 and S360 until the evaluation values Z are calculated for all the evaluation target areas. When the process of S350 and S360 has completed for all the evaluation target areas (S370: YES), the main controller 10 proceeds to S380.

Hereinafter, the target area and the evaluation value Z will be describe in detail. According to a first example, at positions which are spaced by an interval of NT1 in the X-axis direction with respect to the standard position Xs, the main controller 10 selects areas centering around the respective spaced positions, each of the areas having pixels, the number of which corresponds to the length BL2, in the X-axis direction, as the evaluation target area.

The length BL2 is a length of the block BE2 in the X-axis direction, and "the number of pixels corresponding to the length BL2" is a value obtained by converting the length BL2 into the number of pixels in the read image data, which corresponds to the number of pixels, in the X-axis direction, of the block BE2 transcribed in the read image data. In the following description, when the length BL2 on the read image data is referred to, the length BL2 is the value converted to the number of pixels. So is the length BL1.

That is, a group of the evaluation target areas in the first example includes the areas arranged at every interval of INT1 and having the length of BL2 with respect to the standard position Xs at which the side ends of the blocks BE1 and BE2 extending along the Y-axis are aligned in the Y-axis direction. The interval INT1 is identical to the length BL1 of the block BE1 (i.e., INT1=BL1).

In other words, the group of the evaluation target areas includes the areas each having the length BL2 in the X-axis direction centering around a position X=INT1·k, where k=−K, . . . , 2, 1, 0, 1, 2, . . . , K, when the standard position Xs is set as an origin (i.e., X=0) of the X coordinate. Thus, a k-th evaluation area is an area at which INT1·k−(½)·BL2≤X≤INT1·k+(½)·BL2.

It is noted that the size, in the Y-axis direction, of the evaluation target area can be defined so as not to overlap the adjoining intersecting pattern CP. For example, the evaluation target area can be set to an area having a particular number of pixels which is equal to or less than the number of pixels corresponding to a forming interval L1 in the auxiliary scanning direction of the intersecting pattern CP, centering around the Y coordinate of the standard position Xs of the intersecting pattern CP of interest. Alternatively, the evaluation target area can be set, as indicated by the broken lines in FIG. 17, to an area which has a particular number of pixels centering around an existing point of each block BE1 the first pattern PE contains.

Optionally, it is noted that the value K (the group of evaluation target areas) may be determined taking a variable range of the intersection position Xc into account. According to the present embodiment, the conveying error ΔY of the sheet Q is assumed to be less than the width BW1 of the block BE, in particular, less than the dot pitch in the auxiliary scanning direction, and accordingly, a variable range of the intersection position Xc is limited.

According to a second example which replaces the first example, the main controller 10 is configured to select the areas defined to center around positions which are separated by a second interval INT2 in the X-axis direction on the basis of the standard position Xs, each area having the number of pixels corresponding to the length BL1 in the X-axis direction as the evaluation target areas. It is noted that the length BL1 is the length of the block BE1 in the X-axis direction. The second interval INT2 is coincident with the length of the block BE2 (i.e., INT2=BL2).

That is, the group of the evaluation target areas according to the second example includes the areas each having the pixels the number of which corresponds to the length BL1 in the X-axis direction centering around a position X=INT2·k, where k=−K, . . . , 2, 1, 0, 1, 2, . . . , K, when the standard position Xs is set as an origin (i.e., X=0) of the X coordinate. Thus, a k-th evaluation area is an area at which INT2·k−(½)·BL1≤X≤INT2·k+(½)·BL1. The evaluation target area according to the second example can be defined as areas each having the particular number of pixels in the Y-axis direction.

It is noted, however, according to the present embodiment, the length BL1 of the block BE1 and the length BL2 of the block BE2, when expressed in an integer expression of a dot unit or a pixel unit in the read image data, satisfy conditions indicated below. Concretely, a different between the length BL2 and the length BL1 (i.e., BL2−BL1) coincides with a GCF (greatest common factor) M of the lengths BL1 and BL2. Under the circumstance where the above condition is satisfied, the first interval INT1 is set to the length BL1 of the block BE, and the second interval INT2 is set to the length BL2 of the block BE2. For example, then the block BE1 contains 16 pixels and the block BE2 contains 18 pixels, BL−BL1=2, which coincides the GCF of values 16 and 18.

An advantage in setting the lengths BL1 and BL2, the intervals INT2 and INT2 and the group of the evaluation target areas is that, when the average value, a sum or an equivalent value of the widths W in the evaluation target area is calculated as the evaluation value Z of the widths W of the evaluation target area, linearity of the evaluation value Z in the X-axis direction is secured, and detection of the intersection position Xc based on the distribution of the evaluation values Z can be performed at high accuracy.

The reason is indicated below. Consider that there are two natural numbers BL1 and BL2 which has a relationship of BL2>BL1. When Q1 and Q1 are relatively prime natural numbers, and M is a GDC of BL1 and BL2 can be expressed such that:

$$BL1 = M \cdot Q1; \text{ and}$$

$$BL2 = M \cdot Q2.$$

Figure 17:
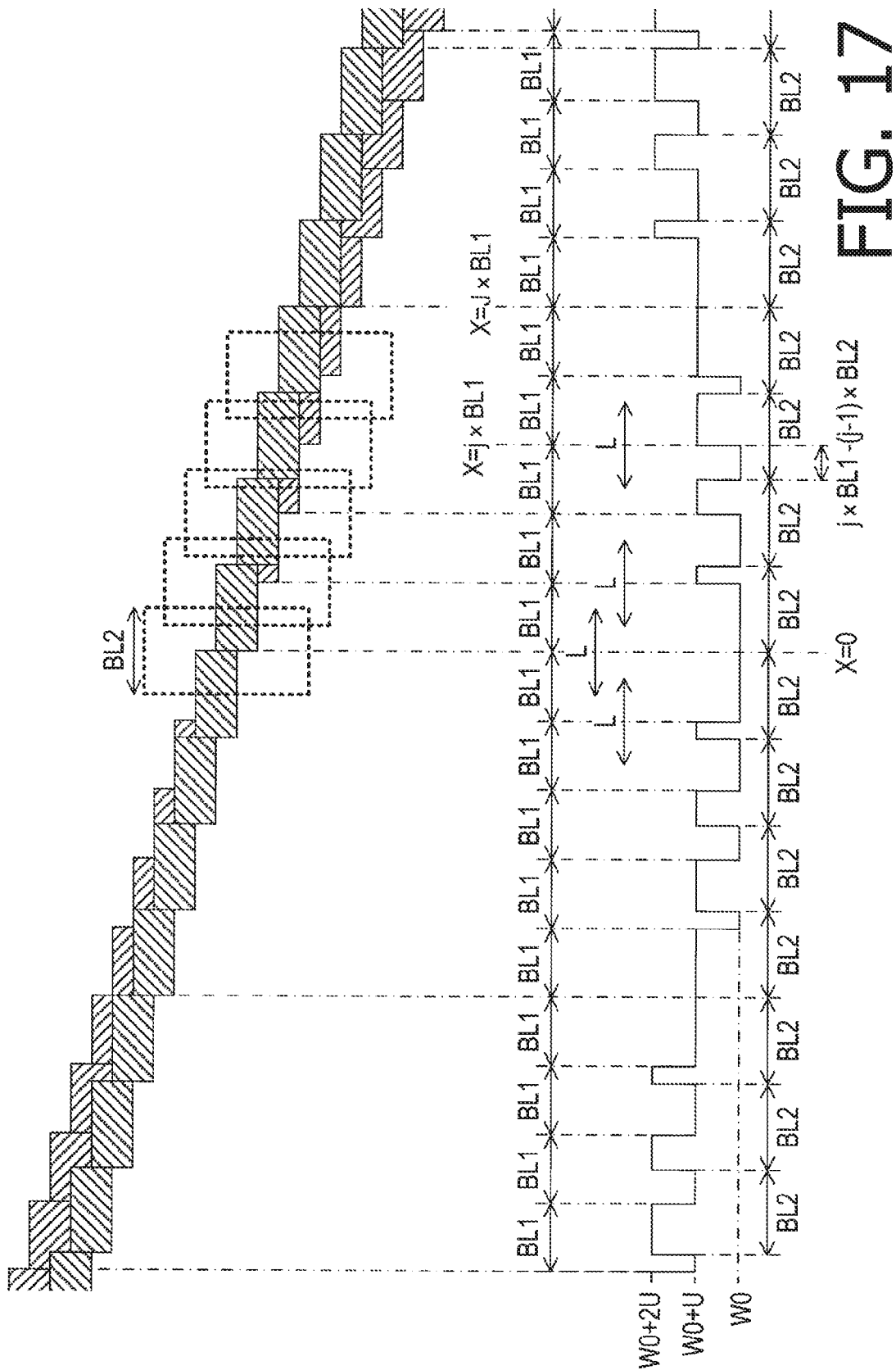
FIG. 17 illustrates an evaluation target areas.

Consider a position, from a coordinate of X=0 in FIG. 17, at a distance which is j times the block BE2 having the length of BL1. Between sections sandwiching the position, a length of a section having a smaller width W in the Y-axis direction is j·BL1−(j−1)·BL2, and a length of a second having a larger width W in the Y-axis direction is j·(BL2−BL1). When j·BL1−(j−1)·BL2=0, j=J=BL2/(BL2−BL1).

It is assumed that J is an integer. Since Q1 and Q2 are relatively prime numbers, J becomes an integer only when Q2−Q1=1, or only when (BL2−BL2) coincides with the GDC M.

An average value of the widths W in the area, centering around the X coordinate of j·BL1, of which length in the X-axis direction is L when 0<j<J is expressed as follows.

(I) the average value when (L/2)≧j·(BL2−BL1)

$$\frac{j \cdot (BL2 - BL1)}{L} \cdot (W0 + U) + \left\{1 - \frac{j \cdot (BL2 - BL1)}{L}\right\} \cdot W0 =$$

$$\frac{j \cdot (BL2 - BL1)}{L} \cdot U + W0$$

(II) the average value when (L/2)<j·(BL2−BL1)

$$\frac{j \cdot BL1 - (j-1) \cdot BL2}{L} \cdot W0 + \left\{1 - \frac{j \cdot BL1 - (j-1) \cdot BL2}{L}\right\} \cdot (W0 + U) =$$

$$\frac{j \cdot (BL2 - BL1)}{L} \cdot U - \frac{BL2}{L} \cdot U + W0 + U$$

In the above equations W0 is same as the widths BW1 and BW2 of the blocks BE1 and BE2 (BW1=BW2), and U is half the widths BW1 and BW2 of the blocks BE1 and BE2 (BW1=BW2). It is understood from the above equations, starting from j=0 at which the width W=W0, at every increase of j by one, the average value increase by U·(BL2−BL1)/L.

There is cyclic nature that the width W increases by U when X increases by J·BL1. The average value of the widths W when j=J is expressed as follows.

(III) the average value W0+U when j=J

When j increase by one, the average value increases by U·(BL2−BL1)/L. Therefore, when j=J, the average value should be U. That is, J·[U·(BL2−BL1)/L]=U should be satisfied. Since J=BL2/(BL2−BL1), BL2/L=1, and therefore, L=BL2.

When L=BL2, the items (I), (II) and (III) above are integrated, and the average value of the widths W in the area is (j/J)·U+W0. If a relationship X=j·BL1 is used, the average value can be expressed as [X/(J·BL1)]*U+W0.

Therefore, when the average value of the widths W, the sum of the widths W, or its equivalent value is calculated as the evaluation value Z of the evaluation target area, by setting the evaluation target area as described above, the linearity of the evaluation value Z can be secured. In other words, it becomes possible to suppress variation of the evaluation value Z in each area due to non-uniform variation of the width W as the first patterns PE1 and the second patterns PE2 are arranged stepwise, and the appropriate evaluation value Z can be calculated for each area.

Figure 18:
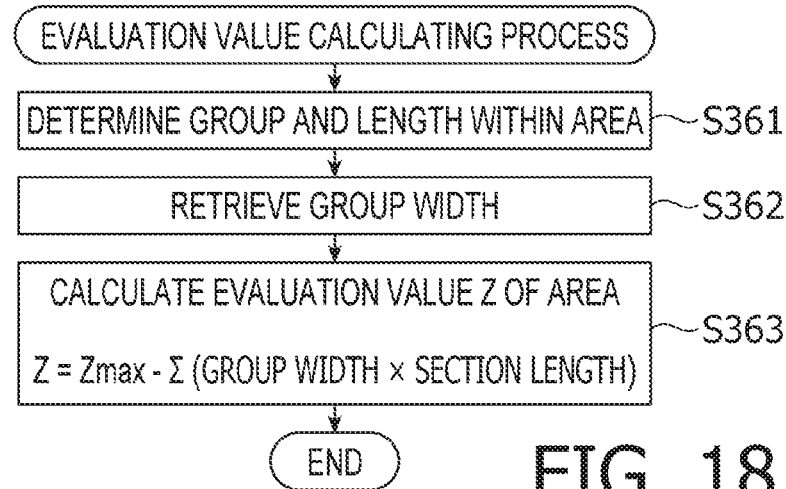
FIG. 18 is a flowchart illustrating an evaluation value calculating process executed by the main controller.

When one of the evaluation target areas, which are defined in accordance with the above theory, is selected (S350), the main controller executes the evaluation value calculating process shown in FIG. 18 in S160 (FIG. 10), and calculates the evaluation value Z of the width W corresponding to the selected evaluation target area.

When the evaluation value calculating process is started, the main controller 10 determines the pixel group to which each section of the intersecting pattern CP located within the evaluation target area selected in S350 and a length of each section (hereinafter, also referred to a section length) (S361). As surrounded by the broken lines in FIG. 17, the evaluation target area could include a plurality of sections respectively having different widths W. These sections are belong to anyone of the pixel groups mentioned above.

Figure 19A:
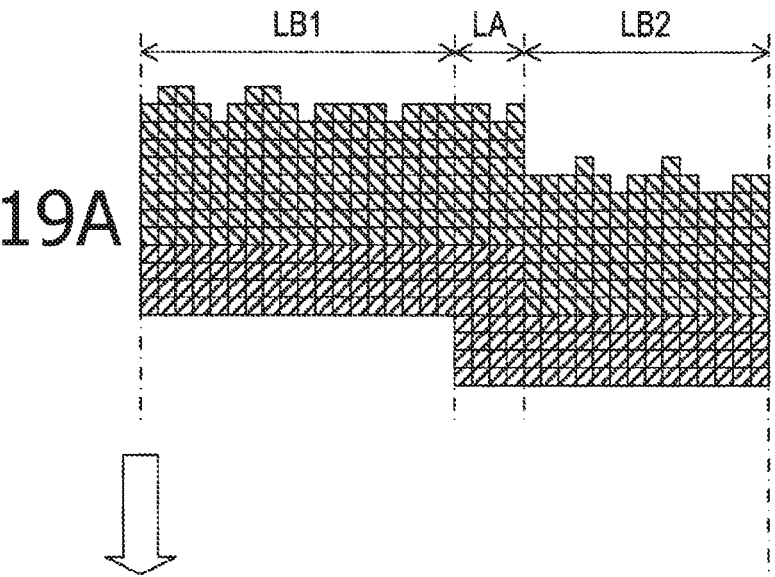
FIGS. 19A and 19B illustrate shaping of an intersecting pattern.

According to FIG. 19, the evaluation target area includes a section of which length is LA and a width thereof in the Y-axis direction in design is 2·W0, a section of which length is LB1 and a width thereof in the Y-axis direction in design is (3/2)·W0, and a section of which length is LB2 and a width thereof in the Y-axis direction in design is (3/2)·W0.

As show in FIG. 18A, in the read image data, the widths W at respective X coordinates within the evaluation target area are not the same, even if the X coordinates belong to the same pixel group in design, due to errors caused in reading and analyzing, but include noise components.

The main controller 10 retrieves, in S362, the information regarding the group widths calculated in S340 for the pixel groups to which the sections included in the evaluation target area determined to belong in S361 in order to eliminate such a noise component by shaping.

Figure 19B:
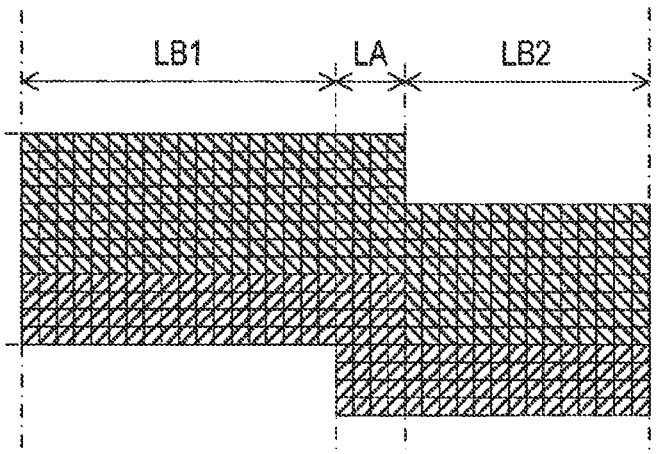

Then, by replacing the width at each X coordinate in each of the sections in the evaluation target area with a group width of the belonging pixel group, the main controller 10 shapes the intersecting pattern CP within the evaluation target area as shown in FIG. 19B, and calculates the evaluation value Z of the evaluation target area (S363).

The evaluation value Z is the sum of binarized brightness values which are obtained by binarizing the brightness values of respective pixels within the evaluation target area in the read image data using the brightness threshold value TH as a boundary. It is noted that the binarization can be realized by converting the brightness value equal to or less than the brightness threshold value TH to a value "0", and the brightness value larger than the brightness threshold value TH to a value "1". When all the binarized brightness values exhibit "1", the evaluation value Z exhibits a maximum value Zmax corresponding to an area of the evaluation target area. When all the binarized brightness values are "0", the evaluation value Z exhibits a minimum value "0".

The shaping in S363 can be realized by extracting image data within the evaluation target area from the read image data, binarizing the brightness values of respective pixels of the extracted image data, and shaping the intersecting pattern transcribed in the image data by replacing the widths W at respective X coordinates with the group width of the pixel group to which the X coordinates belong.

Alternatively, the shaping in S363 may be incorporated in calculation formulae used to calculate the evaluation value Z.

That is, in S363, by calculating the evaluation value Z in accordance with equation below, both the shaping and calculation of the evaluation value Z can be executed simultaneously.

$$Z=Zmax-E[(\text{group width})\cdot(\text{section length})]$$

where, $\Sigma[(\text{group width})\cdot(\text{section length})]$ is a sum of areas which can be obtained, for each section within the evaluation target area, using the group width of the section (i.e., the group width X the section length). In other words, $\Sigma[(\text{group width})\cdot(\text{section length})]$ is the area of the shaped intersection pattern CP within the evaluation target area.

The main controller 10 calculates the evaluation value Z of the widths W for the evaluation target area. The evaluation value Z corresponds to the sum of the brightness values of the evaluation target area. However, according to another embodiment, the evaluation value Z may be an averaged brightness which is calculated by dividing the sum of the brightness values with the area or evaluation target area or a length in the X-axis direction of the evaluation target area.

A value obtained by subtracting the brightness average value, which is calculated by dividing the sum of the brightness values with the length in the X-axis direction of the evaluation target area, from the width in the Y-axis direction of the evaluation target area corresponds to the average value of the widths W in the Y-axis direction of the intersecting patterns CP at respective X coordinates in the evaluation target area. As above, the evaluation value Z is equivalent to the average value or the sum of the widths in the Y-axis direction of the intersecting patterns CP in the evaluation target area.

Figure 20:
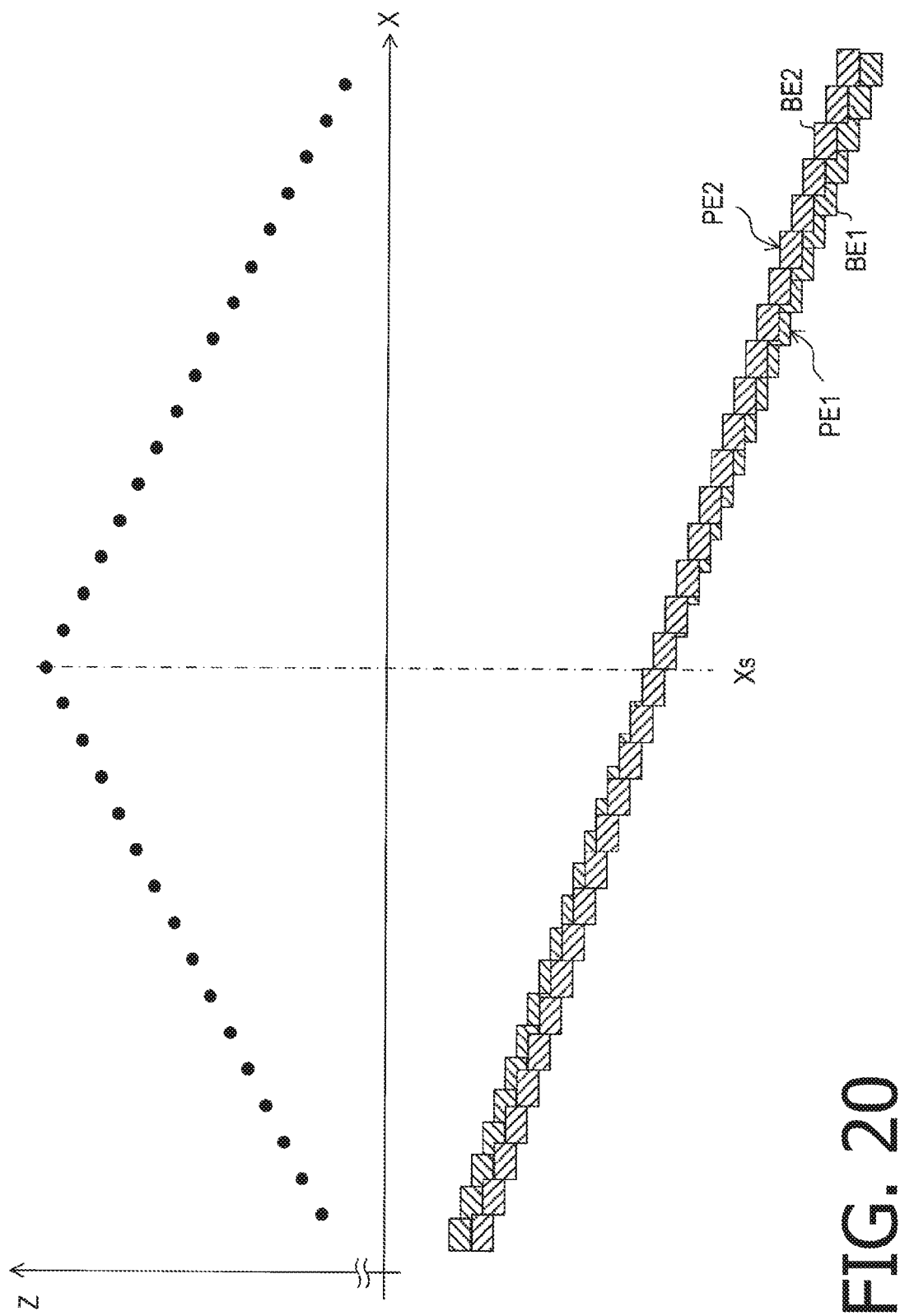
FIG. 20 shows distribution of evaluation values without any control errors.

When the evaluation values Z for all the evaluation target areas have been calculated (S370: YES), the main controller 10 proceeds to S380 (FIG. 10), and generates evaluation distribution data indicating relationship between position coordinates (X coordinates) of centers of the evaluation target areas and the evaluation values Z based on the evaluation values Z of the respective evaluation target areas. If there is no conveying error of the sheet Q, and the intersection position Xc is the standard position Xs, the distribution of the evaluation values Z is as shown in FIG. 20. On an upper area of FIG. 20, the evaluation values Z of the respective evaluation target areas are plotted at the X coordinates of the centers of the evaluation target areas, respectively. On a lower area of FIG. 20, an example of the intersecting pattern CP corresponding to the graph shown on the upper part of FIG. 20.

Figure 21:
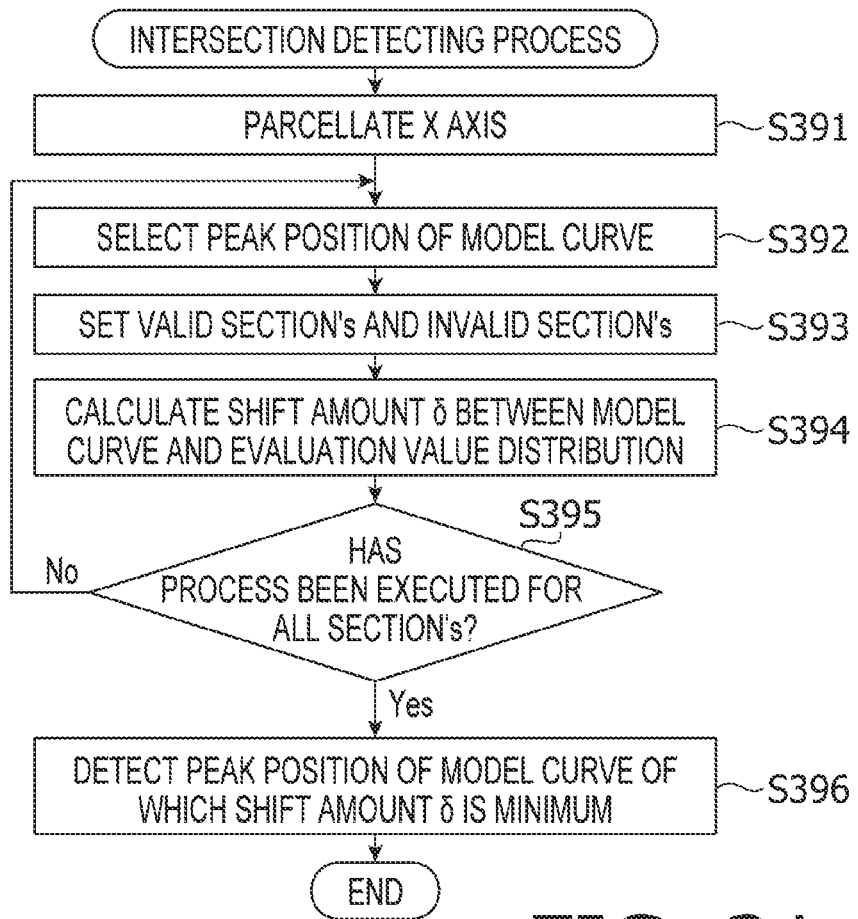
FIG. 21 is a flowchart illustrating an intersection detecting process executed by the main controller.

After execution of S380, the main controller 10 proceeds to S390 and executes an intersection detecting process shown in FIG. 21. In the intersection detecting process, the main controller 10 detects the intersection position Xc of the intersecting patterns CP by fitting a triangular model curve to the distribution of the evaluation values Z to detect a vertex position of the model curve which best matches the distribution of the evaluation values Z. The model curve is a model of a distribution curve of the evaluation values Z and represents ideal distribution of the evaluation values Z. Specifically, the main controller translates the model curve in the X-axis direction (see FIG. 24), calculates a displacement amount δ between the model curve and the distribution of the evaluation values Z at respective positions (i.e., X coordinates), and detects the X coordinate of the vertex of the model curve when the displacement amount δ exhibits the minimum value as the intersection position Xc of the intersecting patterns CP.

Figure 22:
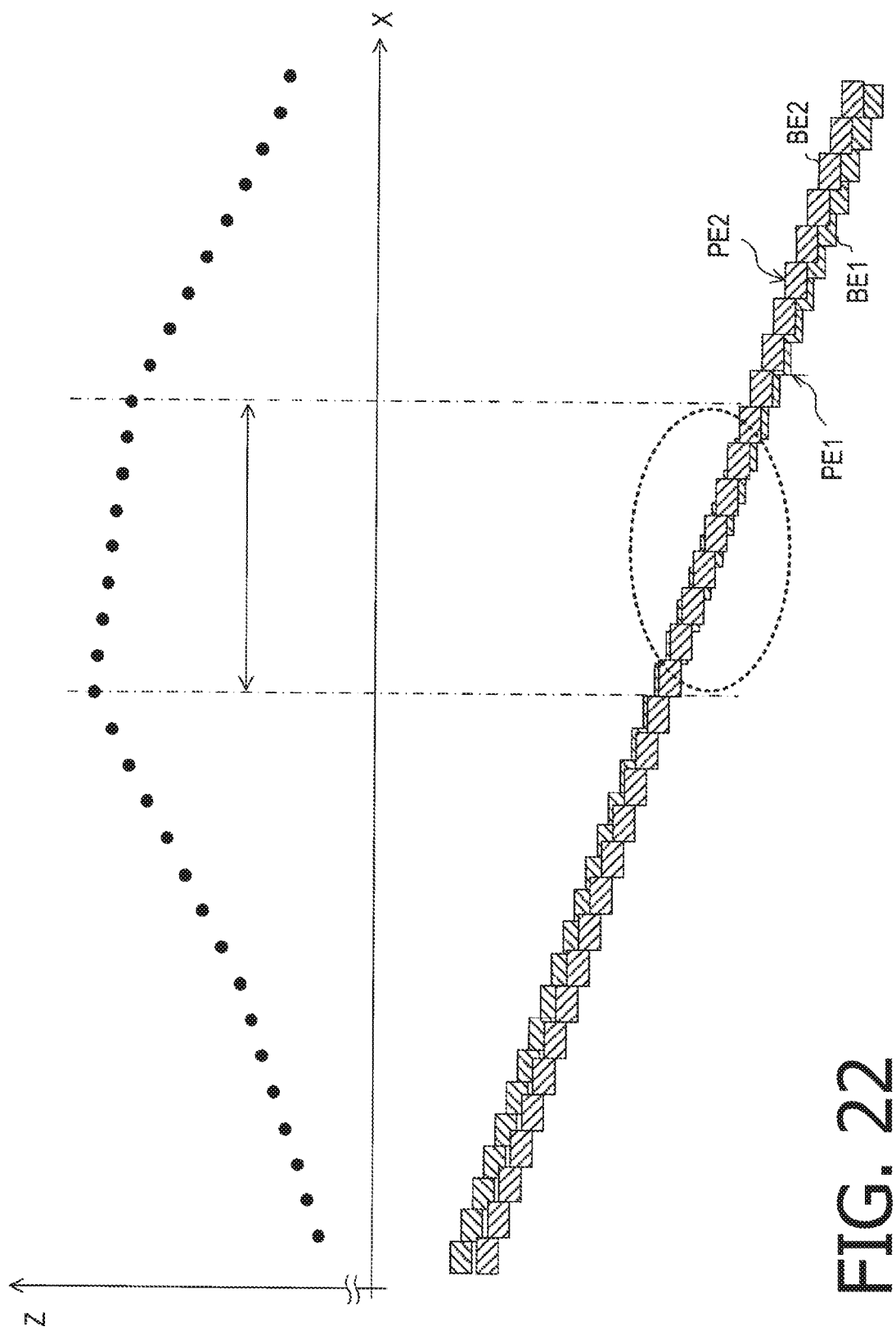
FIG. 22 shows distribution of evaluation values with control errors.
Figure 24:
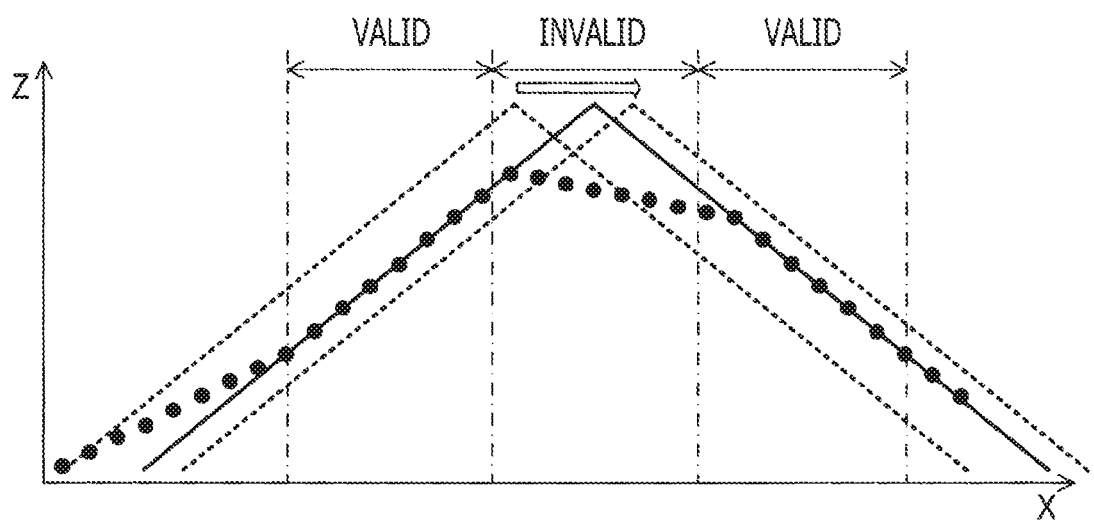
FIG. 24 illustrates fitting of a model curve.

When the intersection position Xc of the intersecting patterns CP is displaced from the standard position Xs due to the conveying error of the sheet Q, there occurs a phenomenon where inclination of the evaluation values Z becomes gentle around the intersection position Xc as shown in FIGS. 22 and 24. Similar to FIG. 20, on an upper part of FIG. 22, the evaluation values Z of respective evaluation target areas are plotted at the position corresponding to the X coordinates of the centers of respective evaluation target areas. Further, on a lower part of FIG. 22, an example of the intersecting pattern CP corresponding to the graph shown in the upper part of FIG. 22 is shown.

According to the example shown in FIG. 22, around the intersection position Xc, when the relative position of the second pattern PE2 with respect to the first pattern PE1 changes, due to both the first pattern PE1 and the second pattern PE2 having stepwise shapes, areas where the block BE2 protrudes on the upper side (i.e., the Y-axis positive direction) and areas where the block BE2 protrudes on the lower side (i.e., the Y-axis negative direction) minutely alternate, as circled by broken lines, and the evaluation values Z which are calculated as the sum of the brightness values of the evaluation target area change little.

The section, where the inclination of the evaluation values Z is gentle, existing around the intersection position Xc could lower the detection accuracy when the intersection position Xc is detected by fitting the model curve to the distribution of the evaluation values Z. Such a section where the inclination is gentle generally appear around the intersection position Xc has a substantially particular shape.

Therefore, according to the present embodiment, valid sections and invalid sections are defined with respect to the vertex of the model curve, and only the evaluation values Z within the valid sections are used to calculate the displacement amount δ with respect to the model curve, influence of the section of which inclination is gentle on the detection accuracy of the intersection position Xc is suppressed.

Figure 23:
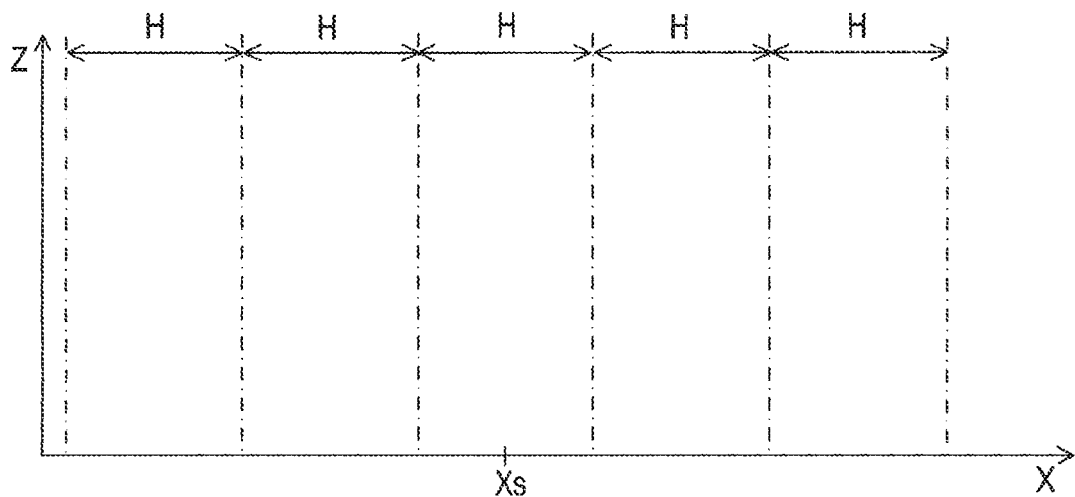
FIG. 23 illustrates parcellation.

When the intersection detecting process shown in FIG. 21 is started (S390), the main controller 10 divides the area of the X coordinates at which the evaluation distribution data has the evaluation values Z into a plurality of sections, as shown in FIG. 23, by parcellating the X coordinates (S391). Dotted lines in FIG. 23 represent dividing lines. The above-described gentle-inclination section has a length corresponding to the LCM of the length BL1 of the block BE1 and the length BL2 of the block BE2. Therefore, based on the standard position Xs which is the intersection position Xc when there are no conveying errors of the sheet Q, the X coordinates is divided for sections each having a length H corresponding to the LCM.

Thereafter, the main controller 10 selects the X coordinate at which the vertex of the model curve is arranged (S392). Further, the main controller 10 sets, among the sections divided in S391, the section including the vertex to the invalid section, the sections on the left (X-axis negative direction) and on the right (X-axis positive direction) with respect to the section including the vertex to the valid sections which are to be referred to when the displacement amount δ is calculated, and the other sections to the invalid sections (S393). The reason why the other sections are set to the invalid sections is, at the position farther from the intersection position Xc, the block BE1 and the block BE2 do not overlap, and thus the evaluation value Z, which is calculated as the sum of the brightness values or the average of the brightness values within the evaluation target area exhibit little change.

That is, in an area farther from the intersection position Xc, the evaluation values Z do not shown a distribution which does not meet the triangular model curve, and therefore, the other sections are set to the invalid sections. It is noted that, when values corresponding to the width from the end of the block BE1 to the end of the block BE2 including the clearance between the block BE1 and the block BE2 are to be calculated as the evaluation values Z, even at sections remote from the intersection position Xc, the other sections can be set to the valid sections since the evaluation values Z exhibit a distribution which meets the triangular model curve.

Thereafter, the main controller 10 calculates the displacement amount δ between the model curve and the evaluation values Z when the model curve is arranged to position the vertex of the model curve to the X coordinate selected in S392 with respect to the graph showing the distribution of the evaluation values Z (S394). The mode curve could be understood to be a triangular curve of which inclination and the local maximum value (the evaluation value Z at the vertex) is fixed.

Concretely, the main controller 10 calculates a standard deviation $(1/Ns)\Sigma(E-<E>)^2$ of the error $E=Z-Zr$ between the evaluation value Z at each X coordinate belonging to the valid section and a value Zr exhibited by the model curve at the X coordinate as the displacement amount δ. It is noted that Ns corresponds to number of evaluation values Z within the valid section (the number of samples) subject to calculation of the standard deviation. The value <E> corresponds to an average of the errors E. The displacement amount δ is calculated with ignoring the evaluation values Z belonging to the invalid sections.

After calculating the displacement amount δ, the main controller 10 determines whether the model curve has been scanned to all the particular ranges (S395). That is, it is determined where the vertex of the model curve has been arranged at all the particular positions and the displacement amounts 6 have been calculated (S395).

When it is determined that the model curve has not been scanned for all the ranges (S395: NO), the main controller 10 proceeds to S392, selects another X coordinate, at which the vertex is arranged, by slightly shifting the X coordinate, and execute the process of S393 onwards to calculate another displacement amount δ.

By moving the model curve in the X-axis direction as shown in FIG. 24, the main controller 10 calculates the displace amount δ at each arrangement of the model curve. After moving the model curve to scan all the range and calculates the displace amounts 6, the main controller 10 makes affirmative decision in S395, and moves to S396.

In S396, the main controller 10 detects the X coordinate of the vertex of the model curve when the displacement amount δ exhibits the minimum value among the displacement values δ calculated for each arrangement of the model curve as the intersection position Xc. Thereafter, the main controller 10 terminates the intersection detecting process.

As described above, the main controller 10 executes the intersection detecting process to detects the intersection position Xc at high accuracy by calculating the displacement amount δ without using the evaluation values Z within the area where the distribution of the evaluation values Z exhibits a gentle inclination so that lowering of the detection accuracy of the intersection position Xc due to the gentle inclination is suppressed. According to the present embodiment, the X coordinates are parcellated as described above and the valid sections and the invalid sections are defined. Alternatively, in S393, by setting a particular range of sections in the X-axis direction centering around the vertex of the model curve to the invalid sections and particular ranges of sections on the right and left sides of the invalid section to the valid sections, respectively, the displace amount δ may be calculated in S394. The length of the invalid section could be a length H corresponding to the LCM described above.

After execution of the intersection detecting process (S390), the main controller 10 determines whether the intersection position Xc has been detected for all the intersecting patterns PC in S400 (FIG. 10). When it is determined that the all the intersection positions Xc have not been detected, the main controller 10 selects the next intersecting pattern CP (S330), and executes the process of S340-S390 for the selected intersecting pattern CP.

When the intersection position Xc has been detected for all the intersecting patterns CP (S400: YES), the main controller 10 terminates the image analyzing process. Then, based on the error ΔX of the detected intersecting position Xc with respect to the standard position Xs for each of the intersecting patterns CP, the main controller 10 calculates the conveying error ΔY of the sheet Q as shown in FIG. 3, and updates the value of the control parameter used for conveyance control of the sheet Q in a direction to suppress the conveying error ΔY (S270). With this configuration, the sheet Q can be conveyed at high accuracy.

According to the MFP 1 described above, the following effects can be obtained. By executing the threshold value setting process in S310, it is possible to suppress deterioration of the detection accuracy of the intersection position Xc caused by the variation of the brightness due to change of the sheet and/or material of the ink. Therefore, the intersection position Xc can be detected at high accuracy.

According to the present embodiment, by setting the compensation rule in S320, the calculation error of the width W due to change of the ink amount depending on whether the block BE1 and the block BE2 overlap can be suppressed. Accordingly, it is possible to detect the intersection position Xc further accurately.

Further, according to the present embodiment, in the intersecting pattern CP, portions having the same widths in design are collected, a representative value (e.g., an average value) for the collected portions is calculated, and the evaluation values Z of the widths of respective areas are calculated so as to shape the width of the intersecting pattern CP. Therefore, deterioration of the detection accuracy due to the noise components can be suppressed, and the intersection position Xc can be detected at high accuracy.

According to the present embodiment, since the evaluation target area is selected and the evaluation value Z for the selected area is calculated, variation of the evaluation values Z due to the stepwise pattern can be suppressed, and the intersection position Xc can be detected at high accuracy.

According to the present embodiment, when fitting the model curve to the distribution of the evaluation values Z to calculate the intersecting position Xc, by neglecting the evaluation values Z within a section in which the inclination of the distribution of the evaluation values Z is gentle, the influence of the section in which the inclination is gentle is suppressed, so that the intersection position Xc can be detected at high accuracy.

Therefore, according to the present embodiment, it is possible to detect the conveying error ΔY of the sheet Q based on the error ΔX of the intersection position Xc with respect to the standard position Xs can be detected at high accuracy, and the control parameter stored in the NVRAM 17 can be appropriately compensated in a direction to suppress the conveying error ΔY of the sheet Q. Therefore, the MFP 1 capable of conveying the sheet Q at high accuracy and forming a high quality image on the sheet Q.

The embodiment according to the present disclosures has been described above. It is noted that aspects of the present disclosure need not be limited to the above-described illustrative embodiment, but can be modified in various ways within the aspects of the present disclosures. In the above-described embodiment, various techniques are included in order to detect the intersection position Xc at high accuracy. Such techniques can be applied to the MFP 1 individually. In other words, part of the techniques described above may not be applied to the MFP 1 according to aspects of the present disclosures.

For example, the brightness threshold TH may be a fixed value. The compensation rule may not be set. That is, the compensation amount C may be zero. Further, the intersecting pattern CP may not be shaped in accordance with the group width.

In the intersection detecting process, after the X coordinates are parcellated to a plurality of sections, a section in which the sum of the evaluation values Z has the maximum value may be identified. Then, the section where the sum of the evaluation values Z exhibit the maximum value is regarded to include the intersection position, and the adjoining sections are set to the valid sections. Thereafter, the evaluation values Z in the valid sections are linearly approximated, respectively, and an X coordinate of the intersection of the thus obtained two approximate straight lines is detected as the intersection position Xc of the intersecting patterns CP.

The first pattern PE1 and the second pattern PE2 are not limited to the above-described configuration. A function of detecting the intersection position, an update/compensation function of the control parameters may be implemented in an electronic device other than the MFP 1. In such a case, a worker engaged in shipment of the MFP 1 may have the sheet Q, on which a test pattern generated by the MFP 1, read by a scanner provided to the electronic device and cause the electronic device to analyze the test pattern in order to set the appropriate control parameter for the MFP 1. Further, the appropriate parameter calculated by the electronic device may be set to the MFP 1 based on the display by the electronic device and/or a signal input from the electronic device to the MFP 1.

It is noted that a function one component has may be divided and provided to a plurality of components. A plurality of components realizing a single function may be integrated to a single component capable of realizing the function. Part of the above-described configurations may be omitted. At least a part of the configuration of the above-described embodiment may be replaced with other configuration, or an additional configuration may be added to the above-described configuration of the embodiment. All scopes included in technical idea identified by recitation of the claims may be an embodiment of the present disclosures.

In the above-described embodiment, the image data is generated by the scanner 70 provided to the MFP 1. The aspect of the present disclosures need not be limited to such a configuration, and the image data may be generated by an external device, and the MFP 1 may be configured to receive the thus generated image data transmitted from the external device.

The reading process (S240) execute by the main controller 10 corresponding to an example of a process of obtaining executed by a controller set forth in the claims. A process of S310-S370 in the image analyzing process executed by the main controller 10 may correspond to an example of a process of calculating executed by the controller. A process of S380 and S390 executed by the main controller 10 may correspond to an example of a process of detecting executed by the controller. Further, a process of S270 executed by the main controller 10 may correspond to a process of compensating executed by the controller. Further, the model pattern MP2 may correspond to an intersection image pattern, and a model pattern MP 1 may correspond to an example of non-intersecting pattern.

What is claimed is:

1. An electronic device, comprising:
    an image acquiring device configured to acquire image data; and
    a controller,
    the controller being configured to execute:
        causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other;
        determining pixels corresponding to the test pattern by comparing brightness of each pixel indicated by the image data with a threshold value, and calculating widths of overlapped image of the first pattern and the second pattern in an orthogonal direction being orthogonal to the reference direction, at a plurality of different positions in the reference direction; and
        detecting intersecting positions of the first pattern and the second pattern in the test pattern based on a distribution of widths at the plurality of different positions,
    wherein the test pattern includes a model pattern having a set width in the orthogonal direction separate from the first pattern and the second pattern, and
    wherein, in calculating, the controller sets the threshold value with which the width of the model pattern in the orthogonal direction calculated from the image data fits the set width, determines the pixels corresponding to the test pattern based on the set threshold value, and calculates widths at the plurality of positions of the overlapped image in the reference direction.

2. The electronic device according to claim 1,
    further comprising an image forming device configured to form an image on a sheet with moving a recording head in a main scanning direction and conveying the sheet in an auxiliary scanning direction orthogonal to the main scanning direction,
    wherein the controller is configured to move the recording head twice in the main scanning direction and print the model pattern with a particular number of nozzles such that the printed model pattern has the set width.

3. The electronic device according to claim 2,
wherein the controller is configured to cause the recording head to print the model pattern, the first pattern and the second pattern.

4. The electronic device according to claim 2,
wherein the controller is configured to not move the sheet in the auxiliary scanning direction when the controller moves the recording head twice in the main scanning direction to print the model pattern.

5. The electronic device according to claim 1,
wherein the model pattern has a non-intersecting image pattern which is a pattern modeling a state where the first pattern and the second pattern do not overlap, the non-intersecting image pattern has the set width in the orthogonal direction, and
wherein, in calculating, the controller sets the threshold value such that widths of the non-intersecting image pattern calculated from the image data fit the known widths of the non-intersecting image pattern.

6. The electronic device according to claim 5,
wherein the model pattern further includes an intersecting image pattern which is a pattern modeling a state where the first pattern and the second pattern overlap at the intersecting position, the intersecting image pattern has a set width in the orthogonal direction,
wherein, in calculating, the controller compensates the widths of the overlapped image at the plurality of positions calculated from the image data based on errors between the width of the intersecting image pattern calculated from the image data and the set width of the intersecting image pattern, and
wherein, in detecting, the controller detects the intersecting position based on the distribution of the widths at the plurality of positions after compensation.

7. The electronic device according to claim 1,
wherein the controller calculates each of the widths at the plurality of positions as an evaluation value with respect to a group of widths, in the orthogonal direction, of the overlapped image at a pixel position along the reference direction within an area defined with respect to a corresponding position among the plurality of positions, the area includes a particular number of pixels in the reference direction.

8. The electronic device according to claim 7,
wherein the evaluation value is an average value of the widths, in the orthogonal direction, of the overlapped image at the respective pixel positions along the reference direction within the area, a sum of the widths, in the orthogonal direction, of the overlapped image at the respective pixel positions along the reference direction within the area, or a value equivalent to the average value or the sum.

9. The electronic device according to claim 7,
wherein, in calculating, the controller calculates each of the widths at the plurality of positions by:
  calculating, for each group in which the widths in design in the orthogonal direction are the same, an average value of the widths in the orthogonal direction at pixel positions along the reference direction within the group or a central value of the widths in the orthogonal direction at pixel positions along the reference direction within the group; and
  calculating, for each of the areas corresponding to the plurality of positions,
evaluation value for a group of the widths, in the orthogonal direction, of the overlapped image in the area when the overlapped image is shaped so that the width, in the orthogonal direction, of each group with the average value or the central value.

10. The electronic device according to claim 1,
wherein the controller calculates each of the widths at the plurality of the positions as a sum of binarized brightness values within an area defined with respect to a corresponding position among the plurality of positions or a value equivalent to the sum, the area includes a particular number of pixels in the reference direction and the orthogonal direction.

11. The electronic device according to claim 10,
wherein, in calculating, the controller calculates each of the widths at the plurality of positions by:
  calculating, for each group in which the widths in design in the orthogonal direction are the same, an average value of the widths in the orthogonal direction at pixel positions along the reference direction within the group or a central value of the widths in the orthogonal direction at pixel positions along the reference direction within the group;
  shaping, for each of the areas corresponding to the plurality of positions, the overlapped image so that the width, in the orthogonal direction, of each group with the average value or the central value; and
  calculating a sum of the widths within the area when the brightness values of the respective pixels within the area are binarized or a value equivalent to the sum.

12. The electronic device according to claim 1,
wherein each of the widths at the plurality of positions is calculated as an evaluation value of a group of widths, in an orthogonal direction being orthogonal to the reference direction, of the overlapped image at respective pixel positions along the reference direction within an area, the area being centered around each of the plurality of positions and including a particular number of pixels in the reference direction,
wherein the test pattern is configured such that a relative position between the first pattern and the second pattern varies in the orthogonal direction when the test patter is formed on the sheet due to individual difference of an image forming system configured to form the test pattern on the sheet,
wherein, in calculating, the controller calculates, as the evaluation value for each of the plurality of positions, one of:
an evaluation value for a group of the widths, in the orthogonal direction, of the overlapped image at the pixel positions along the reference direction within the area including the number of pixels corresponding to the second length W2 in the reference direction and centered around each of locations arranged at every first interval in the reference direction from a base point, the base point being a location defined along the reference direction, the base point being a location in the reference direction at which end sides extending in the orthogonal direction of the first block and the second block being aligned in the orthogonal direction; and
an evaluation value for a group of the widths, in the orthogonal direction, of the overlapped image at the pixel positions along the reference direction within the area including pixels the number of which corresponding to the first length W1 in the reference direction and centered around each of locations arranged at every second interval in the reference direction from the base point, and wherein each of the first length W1 and the second length W2 is integer multiple of a unit length in the reference direction, a difference between the second length W2 and the first length W1 coincides with a greatest common facture of the first length W1 and the second length W2, the first interval is the first length W1, and the second interval is the second length W2.

13. The electronic device according to claim 1, wherein, in detecting, the controller detects a position, in the reference direction, where the a model curve exhibits an extreme value when the model curve is fitted to distribution of the widths at the plurality of positions in the reference direction as the intersection position.

14. The electronic device according to claim 1, wherein formation of the first pattern on the sheet and formation of the second pattern on the sheet are executed with a sheet conveying operation being executed therebetween, and wherein the controller is further configured to compensate a conveying amount of the sheet between the formation of the first pattern and the formation of the second pattern so that a sheet conveying error is reduced based on a positional error between an intersection position of the first pattern and the second pattern when there is not error in the sheet conveying amount and the detected intersection position.

15. An electronic device, comprising:
an image acquiring device configured to acquire image data; and
a controller,
the controller being configured to execute:
causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other;
calculating widths of an overlapped image of the first pattern and the second pattern of the test pattern in an orthogonal direction being orthogonal to the reference direction at a plurality of different positions in the reference direction based on the image data; and
detecting intersecting positions of the first pattern and the second pattern in the test pattern based on a distribution of widths at the plurality of different positions,
wherein the test pattern includes a model pattern having a set width in the orthogonal direction separate from the first pattern and the second pattern,
wherein, in calculating, the controller compensates each of the widths of the overlapped image at the plurality of positions calculated from the image data based on an error between the width of the model pattern calculated from the image data and the set width of the model pattern, and wherein, in detecting, the controller detects the intersecting position based on the distribution of the widths at the plurality of positions after compensation.

16. The electronic device according to claim 15, wherein the model pattern further includes an intersecting image pattern which is a pattern modeling a state where the first pattern and the second pattern overlap at the intersecting position, the intersecting image pattern has a set width in the orthogonal direction, and wherein, in calculating, the controller compensates each of the widths of the overlapped image based on an error between the width of the intersecting image pattern calculated based on the image data and the set width of the intersecting image pattern.

17. The electronic device according to claim 16, wherein, in calculating, the controller determines pixels corresponding to the test pattern by comparing the brightness of each of the pixels indicated by the image data with the threshold value to calculate widths at the plurality of positions, and compensates the widths at the plurality of positions when calculating the widths.

18. The electronic device according to claim 17, wherein, in calculating, the controller executes:
determining a relationship between a width in the orthogonal direction calculated from the read image data and a compensation amount based on an error between the width of the intersecting image pattern calculated from the image data and the set width of the intersecting image pattern; and
compensating widths at the plurality of positions calculated from the image data with the compensation amount in accordance with quantity of the widths based on the determined relationship.

19. An electronic device, comprising:
an image acquiring device configured to acquire image data; and
a controller,
the controller being configured to execute:
causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other;
calculating, based on the image data, widths of an overlapped image of the first pattern and the second pattern in an orthogonal direction being orthogonal to the reference direction at a plurality of different positions in the reference direction; and
detecting intersecting positions of the first pattern and the second pattern in the test pattern based on a distribution of widths at the plurality of different positions,
wherein, in calculating, the controller calculates each of the widths at the plurality of positions by:
calculating, for each group in which the widths in design in the orthogonal direction are the same, an average value of the widths in the orthogonal direction at pixel positions along the reference direction within the group or a central value of the widths in the orthogonal direction at pixel positions along the reference direction within the group; and obtaining the widths at the plurality of positions as the evaluation values, respectively, by calculating, for each of the areas corresponding to the plurality of positions, evaluation value for a group of the widths, in the orthogonal direction, of the overlapped image in the area when the overlapped image is shaped so that the width, in the orthogonal direction, of each group with the average value or the central value.

20. The electronic device according to claim 19,
wherein each of the areas is defined as an area including a particular number of pixels in the orthogonal direction, and
wherein, in calculating, the controller calculates, for each area, a sum of brightness values or a value equivalent to the sum when the brightness value of each of the pixels within the area in the overlapped image after shaping as the evaluation value.

21. The electronic device according to claim 20,
wherein, in calculating, the controller determines pixels corresponding to the test pattern by comparing the brightness values of pixels indicated by the image data with a threshold value, and binarizes the brightness values of respective pixels within the area using the threshold value as a boundary.

22. An electronic device, comprising:
an image acquiring device configured to acquire image data; and
a controller,
the controller being configured to execute:
causing the image acquiring device to acquire the image data representing an image formed on a sheet, the image containing a test pattern including a first pattern and a second pattern, the first pattern being configured such that a plurality of first blocks each having a first length W1 in a reference direction are arranged in a first direction, the first direction being inclined with respect the reference direction at an acute angle, the second pattern being configured such that a plurality of second blocks each having a second length W2 longer than the first direction in the reference direction are arranged in a second direction, the second direction being inclined at an angle within an angle range formed between the reference direction and the first direction, the first pattern and the second pattern intersecting with each other;
calculating, based on the image data, widths of an overlapped image of the first pattern and the second pattern in an orthogonal direction being orthogonal to the reference direction at a plurality of different positions in the reference direction; and
detecting intersecting positions of the first pattern and the second pattern in the test pattern based on a distribution of widths at the plurality of different positions,
wherein each of the widths at the plurality of positions is calculated as an evaluation value of a group of widths, in an orthogonal direction being orthogonal to the reference direction, of the overlapped image at respective pixel positions along the reference direction within an area, the area being centered around each of the plurality of positions and including a particular number of pixels in the reference direction,
wherein the test pattern is configured such that a relative position between the first pattern and the second pattern varies in the orthogonal direction when the test patter is formed on the sheet due to individual difference of an image forming system configured to form the test pattern on the sheet,
wherein, in calculating, the controller calculates, as the evaluation value for each of the plurality of positions, one of:
an evaluation value for a group of the widths, in the orthogonal direction, of the overlapped image at the pixel positions along the reference direction within the area including the number of pixels corresponding to the second length W2 in the reference direction, the area centered around each of locations arranged at every first interval in the reference direction from a base point, the base point being a location defined along the reference direction, the base point being a location in the reference direction at which end sides extending in the orthogonal direction of the first block and the second block being aligned in the orthogonal direction; and
an evaluation value for a group of the widths, in the orthogonal direction, of the overlapped image at the pixel positions along the reference direction within the area including pixels the number of which corresponding to the first length W1 in the reference direction, the area centered around each of locations arranged at every second interval in the reference direction from the base point, and
wherein each of the first length W1 and the second length W2 is integer multiple of a unit length in the reference direction, a difference between the second length W2 and the first length W1 coincides with a greatest common facture of the first length W1 and the second length W2, the first interval is the first length W1, and the second interval is the second length W2.

23. The electronic device according to claim 22,
wherein the area includes a particular number of pixels in the orthogonal direction, and
wherein the evaluation value is a sum of brightness values when the brightness values of respective pixels within the area are binarized or a value equivalent to the sum.

24. An electronic device, comprising:
an image acquiring device configured to acquire image data; and
a controller,
the controller being configured to execute:
causing the image acquiring device to acquire the image data representing an image formed on a sheet, the image containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other;
calculating, based on the image data, widths of an overlapped image of the first pattern and the second pattern in an orthogonal direction being orthogonal to the reference direction at a plurality of different positions in the reference direction; and detecting intersecting positions of the first pattern and the second pattern in the test pattern based on a distribution of widths at the plurality of different positions, wherein, in detecting, the controller moves the model curve in the reference direction with respect to the distribution of the widths at the plurality of positions in the reference direction, calculates each of a plurality of displaced amounts between the distribution of the widths at the plurality of positions and the model curve, and detects a position in the reference direction at which the model curve arranged at a position where the smallest displaced amount being the smallest in the calculated plurality of displaces amounts is calculated exhibits an extreme value as the intersection position.

25. The electronic device according to claim 24, wherein the displaced amount is determined based on the error, with respect to the model curve, of the widths at the plurality of positions excluding positions within a particular range, in the reference direction, from a reference position at which the model curve exhibits the extreme value.

26. The electronic device according to claim 25, wherein, in detecting, the controller moves the model curve in the reference direction with respect to the distribution of the widths at the plurality of positions in the reference direction, calculates standard deviation of errors, with respect to the model curve, of the widths at the plurality of positions excluding positions within the particular range, and detects a position in the reference direction at which the model curve arranged at a position where the smallest standard deviation of error being the smallest in the calculated standard deviation of errors is calculated exhibits an extreme value as the intersection position.

27. The electronic device according to claim 26, wherein the particular range is defined to include a length, in the reference direction, corresponding to the least common multiple of the first length and the second length.

28. An electronic device, comprising:
an image forming device configured to form an image on a sheet with moving a recording head in a main scanning direction and conveying the sheet in an auxiliary scanning direction orthogonal to the main scanning direction;
an optical sensor configured to optically read the image on the sheet and generate read image data representing the image on the sheet; and
a controller configured to control the image forming device and the optical sensor,
wherein the controller is configured to execute:
causing the optical sensor to obtain the read image data containing a test pattern including a first pattern and a second pattern, the first pattern being configured such that a plurality of first blocks each having a first length in a reference direction are arranged in a first direction, the first direction being inclined with respect the reference direction at an acute angle, the second pattern being configured such that a plurality of second blocks each having a second length longer than the first direction in the reference direction are arranged in a second direction, the second direction being inclined at an angle within an angle range formed between the reference direction and the first direction, the first pattern and the second pattern intersecting with each other;
determining pixels corresponding to the test pattern by comparing brightness of each pixel indicated by the read image data with a threshold value;
calculating widths of overlapped image of the first pattern and the second pattern in an orthogonal direction to the reference direction at a plurality of different positions in the reference direction;
detecting intersecting positions of the first pattern and the second pattern in the test pattern based on a distribution of widths at the plurality of different positions, the test pattern having a model pattern having a set width in the orthogonal direction separate from the first pattern and the second pattern;
setting the threshold value with which the width of the model pattern in the orthogonal direction calculated from the read image data fit the set width;
determining the pixels corresponding to the test pattern based on the set threshold value;
calculating widths at the plurality of positions of the overlapped image in the reference direction;
controlling the image forming device to test pattern by forming the first pattern on the sheet and forming the second pattern on the sheet with a sheet conveying operation being executed therebetween; and
compensating a conveying amount of the sheet between the formation of the first pattern and the formation of the second pattern based on the detected intersection position.

* * * * *